US010064120B2

(12) United States Patent
Olsson et al.

(10) Patent No.: US 10,064,120 B2
(45) Date of Patent: Aug. 28, 2018

(54) METHOD AND NODES FOR HANDLING A UE WHICH ROAMS INTO A VISITED NETWORK

(71) Applicant: Telefonaktiebolaget L M Ericsson (publ), Stockholm (SE)

(72) Inventors: Lasse Olsson, Stora Hoga (SE); Dinand Roeland, Sollentuna (SE); Zoltán Turányi, Szentendre (HU); Hans Eriksson, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 311 days.

(21) Appl. No.: 14/652,995

(22) PCT Filed: Jun. 16, 2015

(86) PCT No.: PCT/EP2015/063384
§ 371 (c)(1),
(2) Date: Jun. 17, 2015

(87) PCT Pub. No.: WO2016/202363
PCT Pub. Date: Dec. 22, 2016

(65) Prior Publication Data
US 2017/0150420 A1    May 25, 2017

(51) Int. Cl.
*H04W 4/00* (2018.01)
*H04L 12/28* (2006.01)
(Continued)

(52) U.S. Cl.
CPC ........... *H04W 40/248* (2013.01); *H04W 8/06* (2013.01)

(58) Field of Classification Search
CPC ............... H04W 40/248; H04W 76/02; H04L 29/10018; H04L 12/4625; H04L 67/16; H04L 45/30
(Continued)

(56) References Cited

U.S. PATENT DOCUMENTS 6,728,232 B2 * 4/2004 Hasty, Jr. .......... H04L 29/12018
370/338
8,583,753 B1 * 11/2013 Bhagwatula ............ H04L 67/16
709/208

(Continued)

FOREIGN PATENT DOCUMENTS

CN          101730074 A       6/2010

OTHER PUBLICATIONS

"3rd Generation Partnership Project: Technical Specification Group Services and System Aspects; Architecture Enhancement for Flexible Mobile Service Steering; (Release 13)", 3GPP Draft; 23718-040-FMSS-CL, 3rd Generation Partnership Project (3GPP), Mobile Competence Centre; 650, Route Des Lucioles; F-06921 Sophia-Antipolis Cedex, France, Jun. 5, 2015, XP050983802, 38 pages.
(Continued)

*Primary Examiner* — William D Cumming
(74) *Attorney, Agent, or Firm* — Rothwell, Figg, Ernst & Manbeck, p.c.

(57) ABSTRACT

The embodiments herein relate to a method performed by a control plane node (303) for handling a UE (101) which roams into a visited network (100*a*). At least the network in which the control plane node (303) is comprised is a MSC network. The control plane node (303) transmits a create chain request message to a service chain controller (305). The create chain request message is a request to create a chain of UPF nodes (308) that user plane packets to or from the UE (101) should traverse. The control plane node (303)
(Continued)

receives a create chain response message from the service chain controller (305). The create chain response message indicates that the requested chain has been created.

25 Claims, 24 Drawing Sheets

(51) Int. Cl.
*H04L 12/56* (2006.01)
*H04W 40/24* (2009.01)
*H04W 8/06* (2009.01)

(58) Field of Classification Search
USPC ......... 370/338, 390, 392; 709/208, 227, 242
See application file for complete search history.

(56) References Cited

U.S. PATENT DOCUMENTS

| | | | |
|---|---|---|---|
| 9,294,395 B2* | 3/2016 | Mack-Crane | H04L 12/4625 |
| 2003/0179750 A1* | 9/2003 | Hasty, Jr. | H04L 29/12018 |
| | | | 370/390 |
| 2013/0007286 A1* | 1/2013 | Mehta | H04W 76/02 |
| | | | 709/227 |
| 2013/0188645 A1* | 7/2013 | Mack-Crane | H04L 12/4625 |
| | | | 370/392 |
| 2014/0010084 A1 | 1/2014 | Kavunder et al. | |
| 2014/0169375 A1 | 6/2014 | Khan et al. | |
| 2015/0026362 A1* | 1/2015 | Guichard | H04L 45/30 |
| | | | 709/242 |
| 2017/0150420 A1* | 5/2017 | Olsson | H04W 40/248 |

OTHER PUBLICATIONS

International Search Report and Written Opinion dated Feb. 18, 2016 in International Application No. PCT/EP2015/063384, 13 pages.

Office Action issued by the Taiwanese Patent Office in Application No. 104121541 dated Feb. 3, 2017, 8 pages (10 pages with summary translation).

* cited by examiner

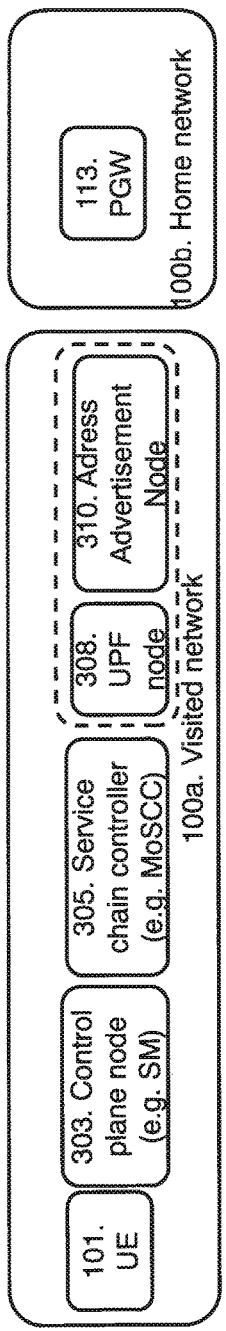 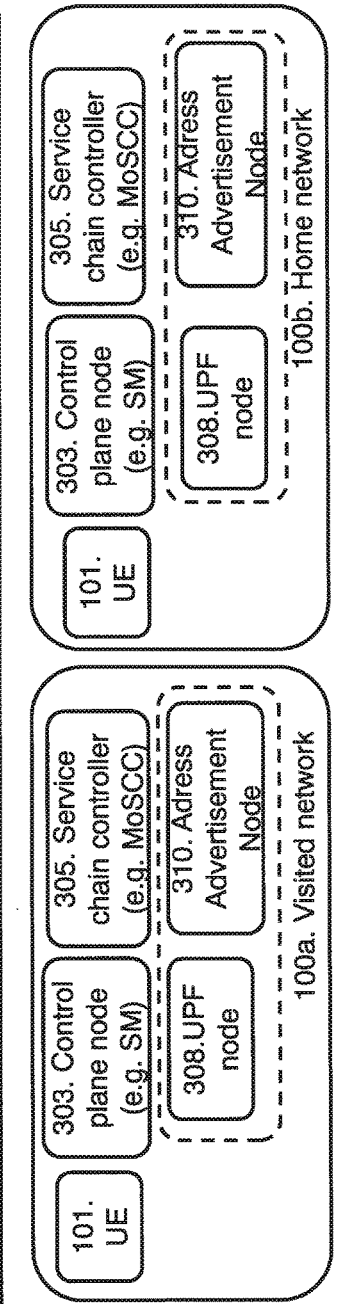 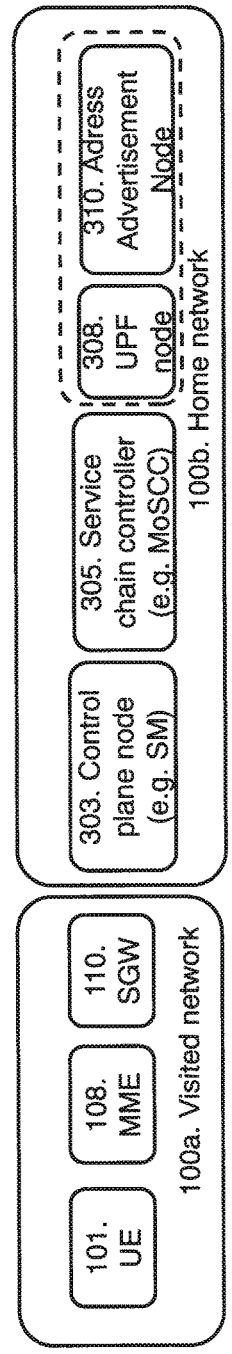
Fig. 5a
Fig. 5b
Fig. 5c

METHOD AND NODES FOR HANDLING A UE WHICH ROAMS INTO A VISITED NETWORK

CROSS-REFERENCE TO RELATED APPLICATION

This application is a 35 U.S.C. § 371 National Phase Entry Application from PCT/EP2015/063384, filed Jun. 16, 2015, and designating the United States.

TECHNICAL FIELD

Embodiments herein relate generally to a control plane node, a method in the control plane node, a service chain controller and a method in the service chain controller. More particularly the embodiments herein relate to handling a User Equipment (UE) which roams into a visited network.

BACKGROUND

Currently a number of activities are ongoing to define requirements on the next generation mobile network (e.g. Fifth Generation (5G)). A key requirement for the next generation mobile networks is flexibility to support multiple use cases. The next generation mobile network may be based on e.g. Software Defined Networking (SDN) that enables a solution with a strict division between control plane and user plane. This allows for flexibility to rapidly deploy network service functions and to support multiple use cases. The architecture of the next generation mobile network may support traffic aggregation on a larger granularity than per-device tunnels. This allows for efficiency and scalability required to support the massive amount of devices in the 5G time frame.

The current Evolved Packet Core (EPC) architecture is optimized for the mobile broadband use case where traffic for an end user passes a Packet Data Network Gateway (PGW) acting as mobility anchor point. It is limited in its flexibility to support new use cases due to the time consuming standardization process. Furthermore, it is envisioned that the 5G core network architecture will have to handle many more devices, which may make today's EPC inefficient since it maintains at least one tunnel per device.

Roaming in 3GPP EPC Architecture

Roaming for the current Third Generation Partnership Project (3GPP) Evolved Packet Core (EPC) roaming architecture is defined by the 3GPP. FIG. 1 shows an example of a roaming architecture with its interfaces. The so-called home-routed roaming is where the UE 101 visits a visited network 100a (e.g. a Visited Public Land Mobile Network (VPLMN, V-PLMN)) and its traffic gets routed through a PGW in the home network 100b (e.g. Home Public Land Mobile Network (HPLMN, H-PLMN)) of the UE 101.

FIG. 1 shows the UE 101 which communicates via a Radio Access Network (RAN) to one or more Core Networks (CNs). The RAN is represented by an Evolved-Universal Terrestrial Radio Access Network (E-UTRAN) 105 in FIG. 1. The E-UTRAN 105 comprises elements such as a RAN node (not shown in FIG. 2). The RAN node may be for example a Base Station (BS), a NodeB, an evolved NodeB (eNode B, eNB), Radio Network Controller (RNC) or any other element capable to communicate with a UE 101. The reference point between the UE 101 and the E-UTRAN 105 may be referred to as LTE-Uu.

A Mobility Management Entity (MME) 108 located in the visited network 100a may be connected to the E-UTRAN 105 via the reference point S1-MME. The MME 108 is an element having function such as e.g. Non-Access Stratum (NAS) signalling, Inter CN node signalling for mobility between 3GPP access networks, UE reachability, Tracking Area (TA) list management, PGW and Serving GateWay (SGW) selection, MME selection for handover with MME change etc. S10 is the reference point between MMEs 108 for MME relocation and MME to MME information transfer.

Two gateways 110 are seen in FIG. 1, i.e. the SGW 110 and the PGW 113. The SGW 110 is located in the visited network 100a and the PGW 113 is located in the home network of the UE 101. The SGW 110 is the gateway which terminates the interface towards E-UTRAN 105. The reference point between the SGW 110 and the E-UTRAN 105 for the per bearer user plane tunneling and inter eNB path switching during handover may be referred to as S1-U. The SGW 110 routes and forwards user data packets, while also acting as the mobility anchor for the user plane during inter-eNB handovers and as the anchor for mobility between LTE and other 3GPP technologies (relaying the traffic between Second Generation/Third Generation (2G/3G) systems and the PGW 113) etc. S11 is the reference point between the SGW 110 and the MME 108.

The PGW 113 is the gateway which terminates the SGi interface towards the Packet Data Network (PDN). The PDN is illustrated in FIG. 1 by the Operator's IP Services (e.g. IMS, PSS etc.) 114. IP is short for Internet Protocol, IMS is short for IP Multimedia Subsystem or IM Multimedia core network Subsystem and PSS is short for Packet Switched Streaming. If the UE 101 is accessing multiple PDNs, there may be more than one PGW 113 for that UE 101. Functions of the PGW 113 are e.g. providing connectivity from the UE 101 to external PDNs by being the point of exit and entry of traffic for the UE 101, performing policy enforcement, packet filtering for each user, charging support, lawful interception and packet screening etc. S5/S8 is the reference point which provides user plane tunneling and tunnel management between the SGW 210 and the PGW 125. S8 is used when the UE 101 roams between different operators while S5 is a network internal interface.

The SGSN 115 is located in the visited network 100a and is responsible for the delivery of data packets from and to the UE's 101 within its geographical service area. SGSN 115 is short for Serving GPRS Support Node, where GPRS is short for General Packet Radio Services. One of the SGSN's 115 functions is to provide signaling for mobility between 2G/3G and E-UTRAN 3GPP access networks. 2G/3G access network are exemplified with GSM EDGE Radio Access Network (GERAN) 118 and Universal Terrestrial Radio Access Network (UTRAN) 120 in FIG. 1. GSM is short for Global System for Mobile communications and EDGE is short for Enhanced Data rates for Global Evolution. Some further functions of the SGSN 115 are to handle packet routing and transfer, mobility management (attach/detach and location management), logical link management, and authentication and charging functions etc. S3 is the interface between the SGSN 115 and the MME 108. S4 is a reference point between the SGSN 115 and the SGW 110. S12 is the reference point between the SGW 110 and the UTRAN 120. In some embodiments, the SGSN 115 and the MME 108 are co-located in one node.

The Home Subscriber Server (HSS) 123 is located in the home network 100b and is a subscriber server node similar to the GSM Home Location Register (HLR) and Authentication Centre (AuC). The HSS 123 comprises subscriber-related information (subscriber profiles), performs authentication and authorization of the user, and may provide information about the subscriber's location and IP information. The reference point S6a enables transfer of subscription and authentication data for authenticating/authorizing user access to the evolved system between the MME 108 and the HSS 123. Note that the HSS 123 is only shown as an example in FIG. 1 and that any type of subscriber database may be used instead of the HSS 123, such as e.g. a. HLR etc.

The Policy and Charging Rules Function (PCRF) 125 is located in the home network 100b and is a policy and charging control element. The PCRF 25 encompasses policy control decision and flow based charging control functionalities, it provides network control regarding the service data flow detection, gating, Quality of Service (QoS) and flow based charging etc. The PCRF 125 may be described as a functional entity which may be a standalone node or a function implemented in another node. The reference point Gx provides transfer of (e.g. QoS) policy and charging rules from the PCRF 125 to e.g. a Policy and Charging Enforcement Function (PCEF) in the PGW 113. Rx is the reference point which resides between the PCRF 125 and the Operator's IP Services 114.

The key tasks that are solved in the roaming architecture illustrated in FIG. 1 include:
- An IP Address needs to be attained/allocated for the UE 101, over the S8 interface.
- To ensure that GPRS Tunneling Protocol (GTP) packets are sent to and received from the home network 100b, over the S8 interface.
- To update the Subscriber Location in the HSS 123, over the S6a interface.

FIGS. 2a and 2b are a signaling diagrams which describes an example of how an attach procedure is performed. FIG. 2a illustrates steps 201-222 and FIG. 2b illustrates steps 223-241, steps 201-222 is performed first and then steps 223-241 are performed. The UE 101 needs to register with the network to receive services that require registration. This registration is described as attachment. In the home-routed roaming case, some of the message exchanges will be over roaming interfaces. E.g. steps 213 and 214 will be over the S8 interface between the SGW 110 in the visited network 100a and the PGW 113 in the home network 100b. Note that the visited network 100a takes the initial contact with the home network 100b, and not vice versa. The dotted arrows in FIGS. 2a and 2b illustrates optional steps. The method illustrated in FIGS. 2a and 2b comprises at least some of the following steps, which steps may be performed in any suitable order than described below:

Step 201
This step is seen in FIG. 2a. The UE 101 initiates the Attach procedure by the transmission, to the eNB 105, of an Attach Request message.

Step 202
This step is seen in FIG. 2a. The eNB 105 derives or selects a new MME 108 and forwards the Attach Request message to the new MME 108.

Step 203
This step is seen in FIG. 2a. The new MME 108 derives the old MME/SGSN 108 address and sends an Identification Request message to this old MME/SGSN 108.

Step 204
This step is seen in FIG. 2a. The old MME/SGSN 108 verifies the Attach Request message and then responds with an Identification Response message to the new MME 108.

Step 205
This step is seen in FIG. 2a. If the UE 101 is unknown in both the old MME/SGSN 108 and new MME 108, the new MME 108 may send an Identity Request message to the UE 101 to request the International Mobile Subscriber Identity (IMSI).

Step 206
This step is seen in FIG. 2a. The UE 101 may respond with an Identity Response message to the new MME 108 with the IMSI.

Step 207
This step is seen in FIG. 2a. If no UE context for the UE 101 exists anywhere in the network, if the Attach Request (sent in step 201) was not integrity protected, or if the check of the integrity failed, then authentication and Non-Access Stratum (NAS) security setup to activate integrity protection and NAS ciphering may be executed. This step involves the UE 101, the new MME 108 and the HSS 123.

Step 208
This step is seen in FIG. 2a. The new MME 108 may send an identity request message to the UE 101, and the UE 101 sends an identity response message to the new MME 108. The identity response message comprises the identity (e.g. IMSI) of the UE 101.

Step 209
This step is seen in FIG. 2a. The new MME 108 may send the ME Identity Check Request message to an Equipment Identity Register (EIR) 130. The EIR 130 may respond to the new MME 108 with an ME Identity Check Acknowledgement (Result) message.

Step 210
This step is seen in FIG. 2a. The new MME 108 may send a Ciphered Options Request message to the UE 101 to retrieve the Ciphered Options i.e. Protocol Configuration Options (PCO) or Access Point Name (APN) or both, from the UE 101.

Step 211
This step is seen in FIG. 2a. The UE 101 may send a Ciphered Options Response message to the new MME 108 with the Ciphered Options.

Step 212
This step is seen in FIG. 2a. If there are active bearer contexts in the new MME 108 for this particular UE 101, the new MME 108 may delete these bearer contexts by sending a Delete Session Request messages to the Gateways (GW) involved, e.g. the SGW 110 and the PGW 113.

Step 213
This step is seen in FIG. 2a. If a PCRF is deployed, the PGW 113 may employ an IP-Connectivity Access Network (IP-CAN) Session Termination procedure to indicate that resources have been released. The PCEF initiated IP-CAN session termination procedure involves the PGW 113 and the HSS 123.

Step 214
This step is seen in FIG. 2a. The GWs (e.g. the PGW 113 and the SGW 110) may acknowledge the Delete Session Request message in step 212 by sending a Delete Session Response (Cause) message to the new MME 108.

Step 215
This step is seen in FIG. 2a. The new MME 108 may send an Update Location Request message to the HSS 123.

Step 216
This step is seen in FIG. 2a. The HSS 123 may send a Cancel Location message to the old MME/SGSN 108.

Step 217
This step is seen in FIG. 2a. The old MME/SGSN 108 may acknowledge the Cancel Location message by sending a Cancel Location Ack to the HSS 123.

Step 218

This step is seen in FIG. 2a. If there are active bearer contexts in the old MME/SGSN 108 for this particular UE 101, the old MME/SGSN 108 may delete these bearer contexts by sending Delete Session Request messages to the GWs involved (e.g. the PGW 113 and the SGW 110).

Step 219

This step is seen in FIG. 2a. If a PCRF is deployed, the PGW 113 may employ a PCEF initiated IP-CAN Session Termination procedure to indicate that resources have been released.

Step 220

This step is seen in FIG. 2a. The GWs (e.g. the PGW 113 and the SGW 110) may return a Delete Session Response message to the old MME/SGSN 108.

Step 221

This step is seen in FIG. 2a. The HSS may acknowledge the Update Location message by sending an Update Location Ack message to the new MME 108.

Step 222

This step is seen in FIG. 2a. The new MME 108 may derive or select a SGW 110 and then it may send a Create Session Request message to the selected SGW 110.

Step 223

This step is seen in FIG. 2b. The SGW 1105 creates a new entry in its Evolved Packet System (EPS) Bearer table and sends a Create Session Request message to the PGW 113.

Step 224

This step is seen in FIG. 2b. If dynamic Policy and Charging Control (PCC) is deployed and the Handover Indication is not present, the PGW 113 may perform a PCEF initiated IP-CAN Session Establishment procedure. The IP-CAN Session Establishment procedure may involve the PGW 113 and the PCRF 125.

Step 225

This step is seen in FIG. 2b. The PGW 113 returns a Create Session Response message to the SGW 110.

Step 226

This step is seen in FIG. 2b. If there is no handover, the PGW 113 may send first downlink data to the SOW 110.

Step 227

This step is seen in FIG. 2b. The SGW sends a Create Session Response message to the new MME 108.

Step 228

This step is seen in FIG. 2b. The new MME 108 sends an Initial Context Setup Request message and an Attach Accept message to the eNB 105.

Step 229

This step is seen in FIG. 2b. The eNB 105 sends an Radio Resource Control (RRC) Connection Reconfiguration message to the UE 101.

Step 230

This step is seen in FIG. 2b. The UE 101 sends the RRC Connection Reconfiguration Complete message to the eNB 105.

Step 231

This step is seen in FIG. 2b. The eNB 105 sends the Initial Context Response message to the new MME 108.

Step 232

This step is seen in FIG. 2b. The UE 101 sends a Direct Transfer message to the eNB 105.

Step 233

This step is seen in FIG. 2b. The eNB 105 forwards the Attach Complete message to the new MME 108.

Step 234

This step is seen in FIG. 2b. After the Attach Accept message and once the UE 101 has obtained a PDN address, the UE 101 may then send uplink packets towards the eNB 105 which may then be tunneled to the SGW 110 and the PGW 113. Uplink may be described as the direction from the UE 101 to the eNB 105, and downlink may be described as the direction from the eNB 105 to the UE 101.

Step 235

This step is seen in FIG. 2b. The new MME 108 sends a Modify Bearer Request message to the SGW 110.

Step 236

This step is seen in FIG. 2b. If the Handover Indication is included in step 235, the SGW 110 may send a Modify Bearer Request message to the PGW 113 to prompt the PGW 113 to tunnel packets from non 3GPP IP access to 3GPP access system and immediately start routing packets to the SGW 110 for the default and any dedicated EPS bearers established.

Step 237

This step is seen in FIG. 2b. The PGW 113 may acknowledge by sending a Modify Bearer Response to the SGW 110.

Step 238

This step is seen in FIG. 2b. The SGW 110 acknowledges by sending a Modify Bearer Response message to the new MME 108.

Step 239

This step is seen in FIG. 2b. The SGW 110 may send its buffered downlink packets to the UE 101.

Step 240

This step is seen in FIG. 2b. The new MME 108 may send a Notify Request message to the HSS 123.

Step 241

This step is seen in FIG. 2b. The HSS 123 may send a Notify Response message to the new MME 108.

SUMMARY

An objective of embodiments herein is therefore to provide support for roaming UEs in an architecture based on Mobile Service Chaining (MSC).

According to a first aspect, the object is achieved by a method performed by a control plane node for handling a UE which roams into a visited network. The control plane node is comprised in the visited network or in a home network. At least the network in which the control plane node is comprised is a MSC network. When the UE roams into the visited network, the control plane node transmits a create chain request message to a service chain controller. The create chain request message is a request to create a chain of UPF nodes that user plane packets to or from the UE should traverse. The create chain request message comprises an identity of the UE. The control plane node receives a create chain response message from the service chain controller. The create chain response message indicates that the requested chain has been created. The create chain response message comprises information which indicates at least one of an address and an identifier of a user plane edge point in the network in which the control plane node is comprised and which the user plane packets should travers in the created chain.

According to a second aspect, the object is achieved by a method performed by a service chain controller for handling a UE which roams into a visited network. The service chain controller is comprised in the visited network or in a home network. At least the network in which the service chain controller is comprised is a MSC network. When the UE roams into the visited network, the service chain controller receives a create chain request message from a control plane node. The create chain request message is a request to create a chain of UPF nodes that user plane packets to or from the UE should traverse. The create chain request message comprises an identity of the UE. The service chain controller creates the requested chain of UPF nodes. The service chain controller determines a user plane edge point in the network which the control plane node is comprised and which the user plane packets should travers. The service chain controller transmits, to the determined user plane edge point, instructions to prepare to serve the UE and the identity of the UE. The service chain controller receives, from the user plane edge point, a confirmation of that the user plane edge point in the chain is prepared to serve the UE and information indicating at least one of an address and identifier of the user plane edge point in the network which the control plane node is comprised and which the user plane packets should travers. The service chain controller transmits a create chain response message to the control plane node. The create chain response message indicates that the requested chain has been created. The create chain response message comprises information which indicates the at least one of the address and identifier of the user plane edge point in the network in which the control plane node is comprised and which the user plane packets should travers in the created chain.

According to a third aspect, the object is achieved by a method performed by a user plane edge point for handling a UE which roams into a visited network. The user plane edge point is comprised in the visited network or in a home network. At least the network in which the user plane edge point is comprised is a MSC network. The user plane edge point receives, from a service chain controller, instructions to prepare to serve the UE. The instructions comprise the identity of the UE. The user plane edge point transmits, to the service chain controller, a confirmation of that the user plane edge point is prepared to serve the UE and information indicating at least one of an address and identifier of the user plane edge point in the visited network which the user plane packets should travers.

According to a fourth aspect, the object is achieved by a control plane node for handling a UE which roams into a visited network. The control plane node is comprised in the visited network or in a home network At least the network in which the control plane node is comprised is a MSC network. The control plane node is adapted to, when the UE roams into the visited network, transmit a create chain request message to a service chain controller. The create chain request message is a request to create a chain of UPF nodes that user plane packets to or from the UE should traverse. The create chain request message comprises an identity of the UE. The control plane node is adapted to receive a create chain response message from the service chain controller. The create chain response message indicates that the requested chain has been created. The create chain response message comprises information which indicates at least one of an address and an identifier of a user plane edge point in the network in which the control plane node is comprised and which the user plane packets should travers in the created chain.

According to a fifth aspect, the object is achieved by a service chain controller for handling a UE which roams into a visited network. The service chain controller is comprised in the visited network or in a home network. At least the network in which the service chain controller is comprised is a MSC network. The service chain controller is adapted to, when the UE roams into the visited network, receive a create chain request message from a control plane node. The create chain request message is a request to create a chain of UPF nodes that user plane packets to or from the UE should traverse. The create chain request message comprises an identity of the UE. The service chain controller is adapted to create the requested chain of UPF nodes. The service chain controller is adapted to determine a user plane edge point in the network which the control plane node is comprised and which the user plane packets should travers. The service chain controller is adapted to transmit, to the determined user plane edge point, instructions to prepare to serve the UE and the identity of the UE. The service chain controller is adapted to receive, from the user plane edge point, a confirmation of that the user plane edge point in the chain is prepared to serve the UE and information indicating at least one of an address and identifier of the user plane edge point in the network which the control plane node is comprised and which the user plane packets should travers. The service chain controller is adapted to transmit a create chain response message to the control plane node. The create chain response message indicates that the requested chain has been created. The create chain response message comprises information which indicates the at least one of the address and identifier of the user plane edge point in the network in which the control plane node is comprised and which the user plane packets should travers in the created chain.

According to a sixth aspect, the object is achieved by a user plane edge point for handling a UE which roams into a visited network. The user plane edge point is comprised in the visited network or in a home network. At least the network in which the user plane edge point is comprised is a MSC network. The user plane edge point is adapted to receive from a service chain controller, instructions to prepare to serve the UE. The instructions comprise the identity of the UE. The user plane edge point is adapted to transmit, to the service chain controller, a confirmation of that the user plane edge point is prepared to serve the UE and information indicating at least one of an address and identifier of the user plane edge point in the visited network which the user plane packets should travers.

Thanks to the message transmitted between the entities in the visited network and the home network, support for roaming UEs in an architecture based on MSC is provided.

Embodiments herein afford many advantages, of which a non-exhaustive list of examples follows:

An advantage of the embodiments herein is that they may provide a more robust system is created. The system may also be simpler to modify.

Another advantage of the embodiments herein is that it may be easy to add e.g. an UPF node.

A further advantage of the embodiments herein is that the control plane is not affected by any changes or errors in the user plane.

Furthermore, the embodiments herein are needed in order to be able to launch a new core network architecture based on MSC which is adapted to handle a roaming UE when at least one of the visited network and a home network are MSC based. The other network may be EPC based or MSC based.

The embodiments herein provide an advantage of providing a separate scaling for the control and user plane.

The embodiments herein provide flexibility in that for example it is easy to add and remove UPFs.

With the embodiments herein, the Time to market (TTM) for new features are reduced for both the control and the user plane.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which:

FIG. 5a, 5b, 5c are schematic block diagrams illustrating embodiments of a communications system.

The drawings are not necessarily to scale and the dimensions of certain features may have been exaggerated for the sake of clarity. Emphasis is instead placed upon illustrating the principle of the embodiments herein.

DETAILED DESCRIPTION

As mentioned above, there is a need for a new mobile core network architecture. For the new mobile core network architecture, some terms needs to be defined.

A service chain may be defined as a sequence of service functions that user plane packets traverse. Using other words, a service chaining solution uses SDN technology to intelligently chain service functions so that traffic from each subscriber only traverses a particular set of service functions as defined by the policy for that particular subscriber. This solution can also be used to apply service chaining policies to operator/user defined services. For example, an operator can configure a service chaining policy such that only web traffic is sent to a content optimization service.

Figure 3:
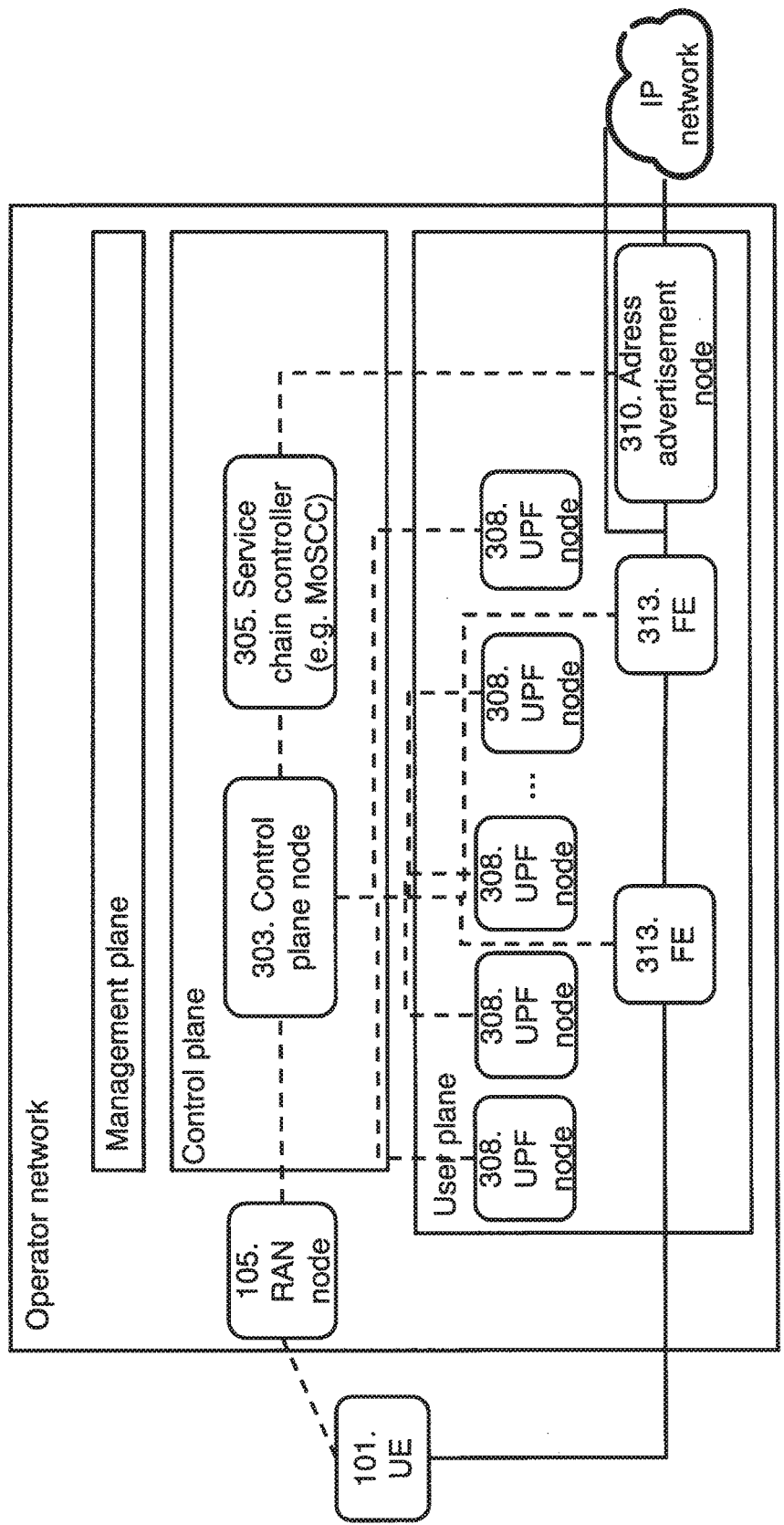
FIG. 3 is a schematic block diagram illustrating embodiments of a communications system.

FIG. 3 illustrates an example of a communications system 300 implementing MSC. Mobile Service Chaining, abbreviated MSC may be described as the ability of the network to combine service chaining with mobility handling.

The MSC architecture is divided into a control plane, a user plane and a management plane. The UE 101 communicates with the control and user plane via one or more accesses. An access node is exemplified with a RAN node 105 in FIG. 3, but the concept is equally applicable to all accesses including fixed access. The RAN node 105 may be for example a BS, a NodeB, an eNB, a RNC or any other element capable to communicate with the UE 101.

The UE 101 may be a device by which a subscriber may access services offered by an operator's network and services outside operator's network to which the operator's radio access network and core network provide access, e.g. access to the Internet. The UE 101 may be any device, mobile or stationary, enabled to communicate in the communications network, for instance but not limited to e.g. user equipment, mobile phone, smart phone, sensors, meters, vehicles, household appliances, medical appliances, media players, cameras, Machine to Machine (M2M) device, Device to Device (D2D) device, Internet of Things (IoT) device or any type of consumer electronic, for instance but not limited to television, radio, lighting arrangements, tablet computer, laptop or Personal Computer (PC). The UE 101 may be portable, pocket storable, hand held, computer comprised, or vehicle mounted devices, enabled to communicate voice and/or data, via the radio access network, with another entity, such as another device or a server.

The control plane comprises all control plane logic, allowing for a strict separation between control and user plane. The control plane comprises a control plane node 303. The control plane node 303 may comprise the control plane parts of the following legacy node functions:
MME 108.
PCRF 125.
SGW 110.
PGW 113.

Examples of interfaces that are terminated in the control plane nodes are: S1-AP, S1-MME, S6a, Rx, S8 (possibly also Gx if a separate PCRF 125 is required). The control plane node 303 may be referred to as e.g. a Session Manager (SM).

The control plane using the MSC architecture may further comprise a service chain controller 305 which may act as a control and user plane (e.g. SDN) controller and which may select a User Plane Function (UPF) node 308, configures Forwarding Elements (FE) 313 executes handovers. The service chain controller 305 may be referred to as a Mobile Service Chain Controller (MoSCC).

The term legacy mentioned above refers to something that is based on older, outdated protocols. For example, a legacy network may be a 3GPP EPC network in relation to a MSC network. A legacy node may be a node which is comprised in a legacy network.

The user plane may contain three types of function nodes: FE 313, UPF nodes 308 and address advertisement node 310.

The term user plane edge point 308, 310 may be used to refer to any of the UPF node 308 and the address advertisement node 310. The user plane edge point 308, 310 may be referred to as a user plane edge node, a user plane edge module, a user plane edge unit or a user plane edge function. The user plane edge point 308, 310 may be a user plane entry point or a user plane exit point of the visited network 100a or the home network 100b. A user plane entry point may also be referred to as a user plane ingress point and a user plane exit point may also be referred to as a user plane egress point.

An FE 313 forwards each packet to one of its ports based on rules it has received from the control plane node 303. An FE 313 may forward a packet through one or more UPF nodes 308. An FE 313 is only concerned with the actual forwarding; it does not classify or modify a packet.

A UPF node 308 processes user plane packets. The processing may include altering the packet's payload and/or packet header. UPF nodes 308 are not expected to know topological information regarding the chain, including which other UPF nodes 308 are in the chain and how to reach them. A UPF node 308 may serve multiple UEs 101, and may keep context per UE. A UPF node 308 handles a collection of flows.

The address advertisement node 310 enables an anchor-less network; i.e. a network without a mobility anchor point. An address advertisement node 310 advertises a range of addresses/prefixes towards an outer network. The address may be e.g. an IP address. This may be Internet or an operator-internal network. A single IP address/prefix may be advertised by multiple IAPs. If the IP address of a specific device is advertised by multiple IAPs, then packets for that device can enter the network via any of those IAPs. Similarly, an anchored approach can be achieved by allowing only a single Internet Protocol (IP) Advertisement Point (IAP) to advertise the IP address for that device. The address advertisement node 310 may be referred to as an IAP.

Figure 4:
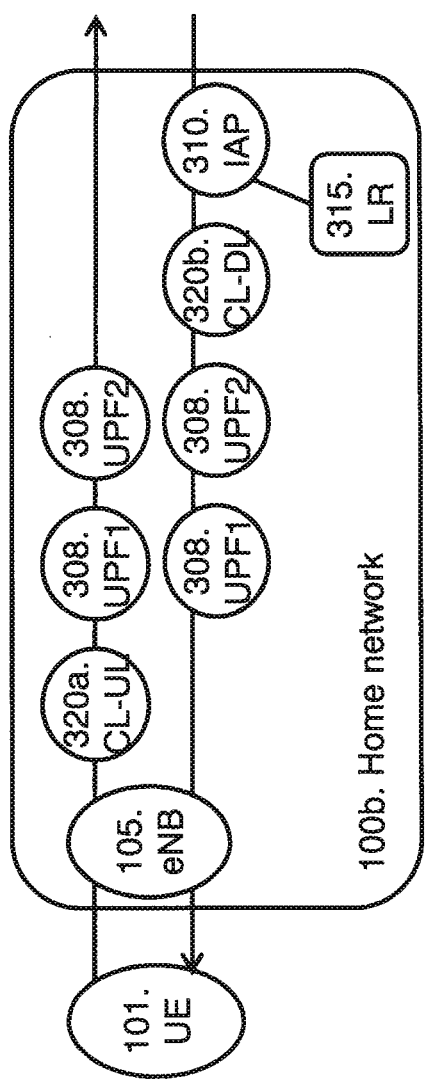
FIG. 4 is a schematic block diagram illustrating embodiments of a communications system in a non-roaming scenario.

The control plane may comprise a Location Registry (LR) 315 (not shown in FIG. 3, but in FIG. 4). This is a table of entries, where each entry is a mapping from UE IP address/prefix to UE IDentifier (ID) and current UE location. The may be encoded as a BS ID. When a UE 101 moves from one RAN node 105 to another, the control plane ensures that a BS ID in the LR is updated with the new location. The BS ID is an example of a location identity (location ID) which indicates the identity of the RAN node 105 which serves the UE 101. The location identity may also be referred to as an eNB ID. An address advertisement node 310 may be only used for downlink packets. For each downlink packet, the address advertisement node 310 does: 1) Query the LR based on the destination IP address of the packet in order to retrieve device ID and location ID; 2) Tag the packet with an identity. The identity may be at least one of an UE ID and a location ID such as e.g. a BS ID; The UE ID may be an optional ID to transmit in step 2). 3) Forward the packet to an FE 313. Note that the LR can be implemented in an optimized and distributed fashion. E.g. the IAP query may be performed towards an IAP-internal cache.

A FE 313 forward packets to different UPF nodes 308 and RAN nodes 105 according to which service chain the packets need to traverse and where the corresponding UEs 101 are located. Such information may be added to the packet as tags by the classifiers. A classifier (CL) is a UPF node 308 that determines which service chain a packet takes based on the packet header and rules it has received from the control plane node 303. A CL may change the packet's header, e.g. adding a tag to indicate which service chain the packet traverses. A CL may contact the control plane node 303 when a packet cannot be classified, or it may drop such packet. A CL may be a downlink or uplink CL.

Tags are logically expressed with a name/value pair. A packet may have one or more tags. There are multiple ways to carry tags in packets. In certain cases, an existing protocol element can act as tag value; e.g. an IP address acts as UE ID.

Putting it all together, an uplink packet would traverse the RAN node 105 and one or more Fes 313. Each FE 313 may forward the packet via one or more UPF nodes 308. Similarly, a downlink packet would traverse the address advertisement node 310, one or more FEs 313 and a RAN node 105. In both uplink and downlink, at least one UPF node 308 may act as a CL.

It should be noted that the communication links in the communications system illustrated in FIG. 3 may be of any suitable kind including either a wired or wireless link. The link may use any suitable protocol depending on type and level of layer (e.g. as indicated by the Open Systems Interconnection (OSI) model) as understood by the person skilled in the art.

FIG. 4 is another example of the communications system 300 implementing MSC. The RAN node 105 is exemplified with an eNB 105 in FIG. 4. The UE 101 illustrated in FIG. 4 is not roaming, i.e. it is in its home network 100b. In such example, the LR 315 may hold the location, i.e. the base station 101, to which the UE 101 is currently connected. FIG. 4 further illustrates two UPFs 308 (UPF1 and UPF2) in the uplink direction, and two UPFs 308 (UPF1 and UPF2) in the downlink direction. FIG. 4 illustrates a Classifier-Uplink (CL-UL) 320a which is a classifier in the uplink direction and a Classifier-Downlink (CL-DL) 320b which is a classifier in the downlink direction. As mentioned earlier, a classifier is a type of UPF that determines which service chain a packet takes based on the packet header and rules it has received from the control plane node 303. The CL-UL 320a in the uplink direction is located between the eNB 105 and the UPFs 308. The CL-DL 320b in the downlink direction is located between the UPFs 308 and the IAP 310. The IAP 310 is in the downlink direction and is connected to the LR 315.

The MSC architecture may be organized in different ways such as e.g. the following three scenarios:

1. The visited network 100a is based on MSC and the home network 100b is a legacy EPC network.
2. Both the visited network 100a and home network 100b are based on MSC.
3. The visited network 100a is a legacy EPC network and the home network 100b is based on MSC.

Figure 1:
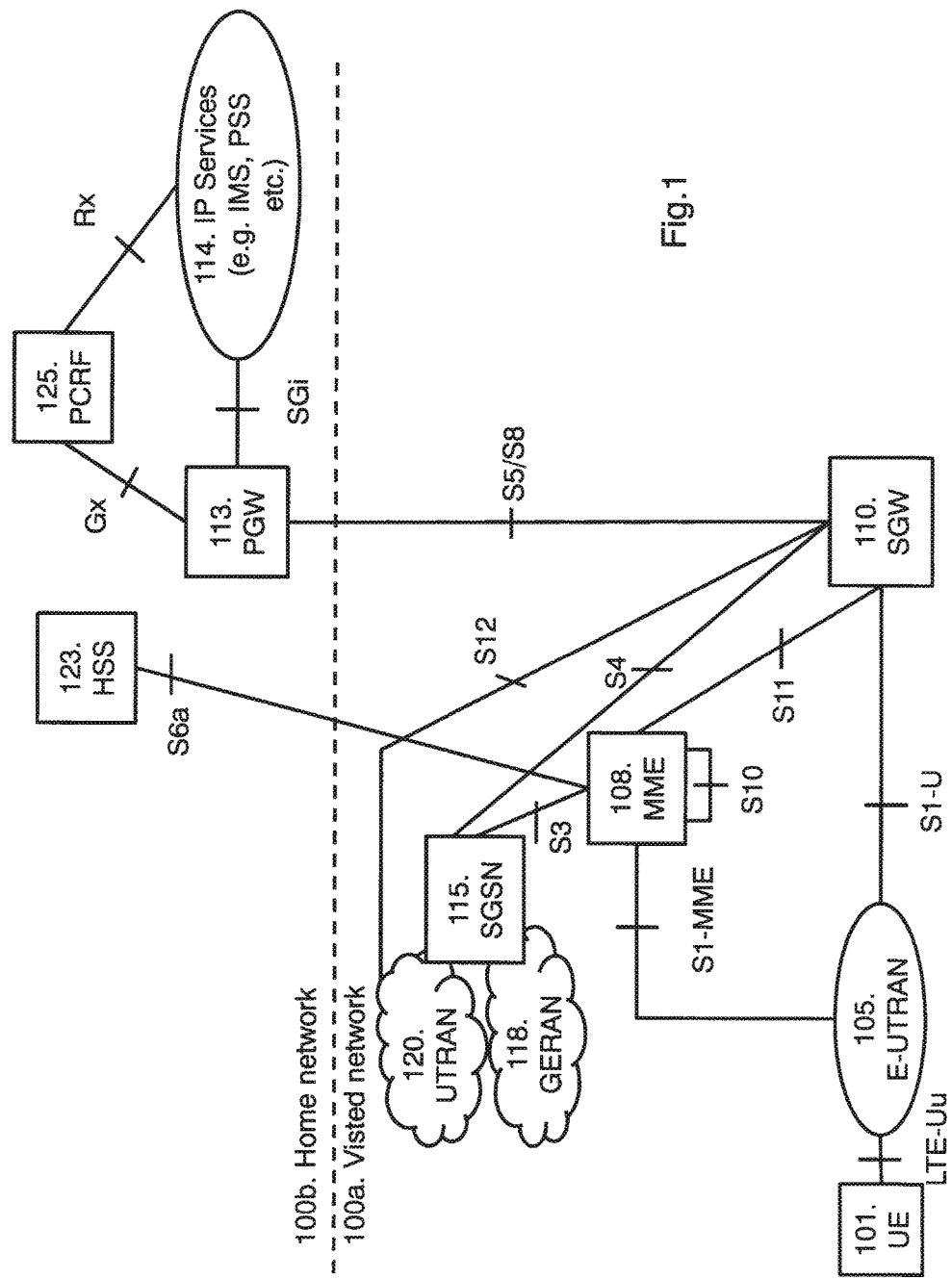
FIG. 1 is a schematic block diagram illustrating an example of a home-routed roaming architecture.

These three scenarios are illustrated in FIGS. 5a, 5b and 5c. FIG. 5a illustrates scenario 1 where the visited network 100a is based on MSC and the home network 100b is a legacy EPC network (not using MSC). FIG. 5b illustrates scenario 2 where both the visited network 100a and home network 100b are based on MSC. FIG. 5c illustrates scenario 3 where the visited network 100a is a legacy EPC network and the home network 100b is based on MSC. Only some of the nodes in the MSC network in FIG. 3 and the legacy EPC network in FIG. 1 are illustrated in FIGS. 5a, 5b and 5c for the sake of simplicity. However, the networks illustrated in FIGS. 5a, 5b and 5c may comprise any of the nodes illustrated in FIGS. 1 and 3. The dotted box around the UPF node 308 and the address advertisement node 310 indicates the user plane edge point 308, 310 which may be used to refer to any of the UPF node 308 and the address advertisement node 310.

Figure 6:
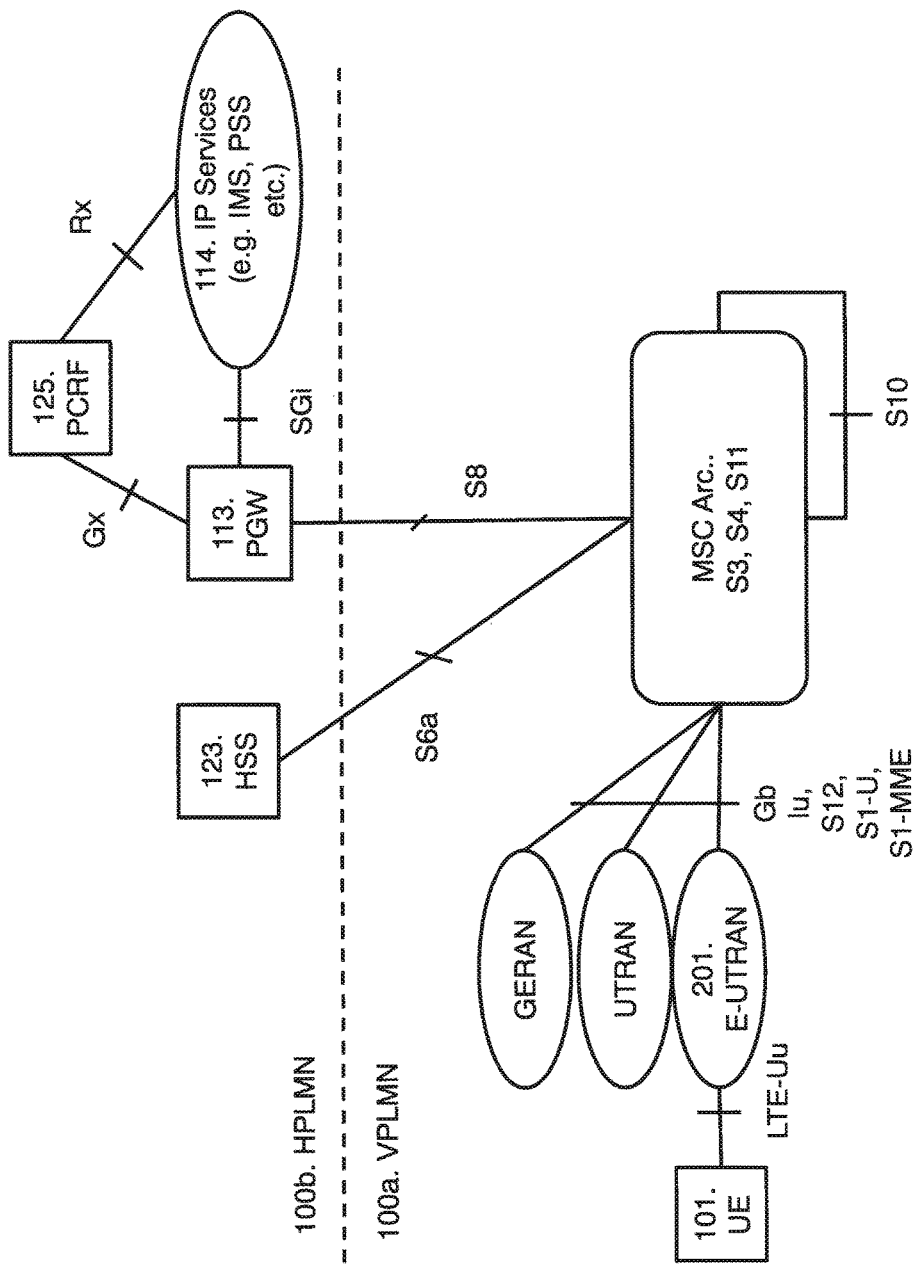
FIG. 6 is a schematic block diagram illustrating embodiments of a communications system.
Figure 7:
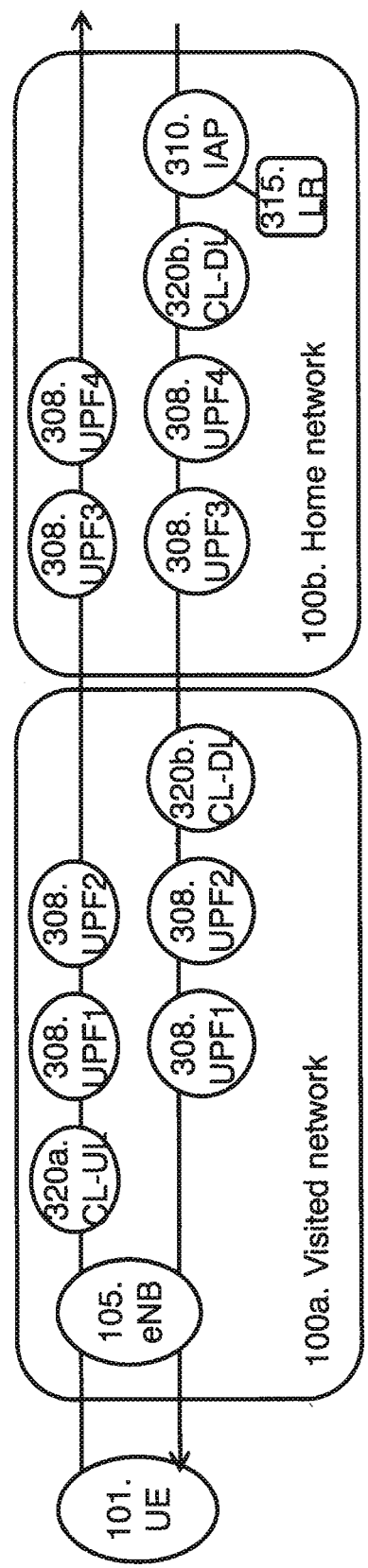
FIG. 7 is a schematic block diagram illustrating embodiments of a communications system.

Scenario 1 is also illustrated in FIG. 6, where the home network is a legacy EPC network and the visited network 100a is based on MSC and when a UE 101 is roaming in to the visited network 100*a*. Scenario 2 is also illustrated in FIG. 7, where both the home network 100*b* and the visited network 100*a* are based on MSC and when a UE 101 is roaming in to the visited network 100*a*. In scenario 2, both the home network 100*b* and the visited network 100*a* may have their own UPFs 308. The RAN node 105 is exemplified with an eNB 105 in FIG. 7. In FIG. 7, only the home network 100*b* comprises the IAP 310 and the LR 315. In the home network 100*b*, there are two UPFs 308 (UPF3 and UPF4) in the uplink and two UPFs 308 (UPF3 and UPF4) in the downlink. The downlink of the home network 100*b* also comprises a CL-DL 320*b*, an IAP 310 and a LR 315. The visited network 100*a* which is visited by the UE 101 comprises two UPFs 308 (UPF1 and UPF2) and a CL-UL 320*a* in the uplink and two UPFs 308 (UPF1 and UPF2) and a CL-DL 320*b* in the downlink.

When the UE 101 roams in a communication system based on MSC, the visited network 100*a* is unaware about the home network architecture; it could be Mobile Service Chained or a legacy PGW. In the situation where the home network 100*b* is based on MSC, the LR 315 cannot contain (base station) location information because the home network 100*b* does not know the location of the UE 101 in the visited network 100*a*. In order to ease migration to the Mobile Service Chaining architecture the different architectures have to be able to co-exist. With the embodiments herein, roaming is supported in the Mobile Service Chaining architecture, in addition to letting the Mobile Service Chaining architecture co-exist with legacy networks in roaming cases.

The three scenarios will now each be described in more detail.

Figure 8A:
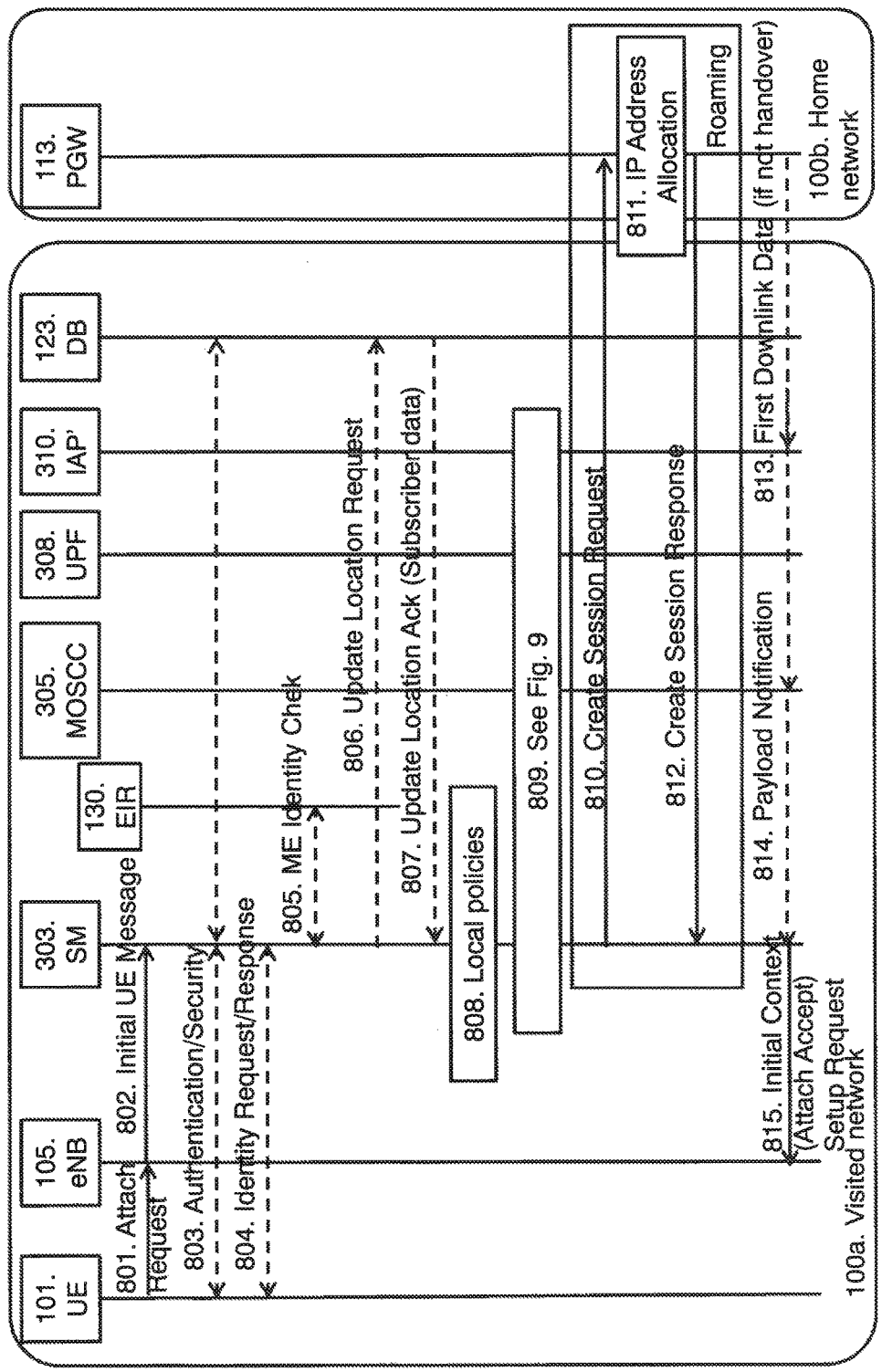
FIG. 8a, 8b are signaling diagrams illustrating embodiments of a method.
Figure 8B:
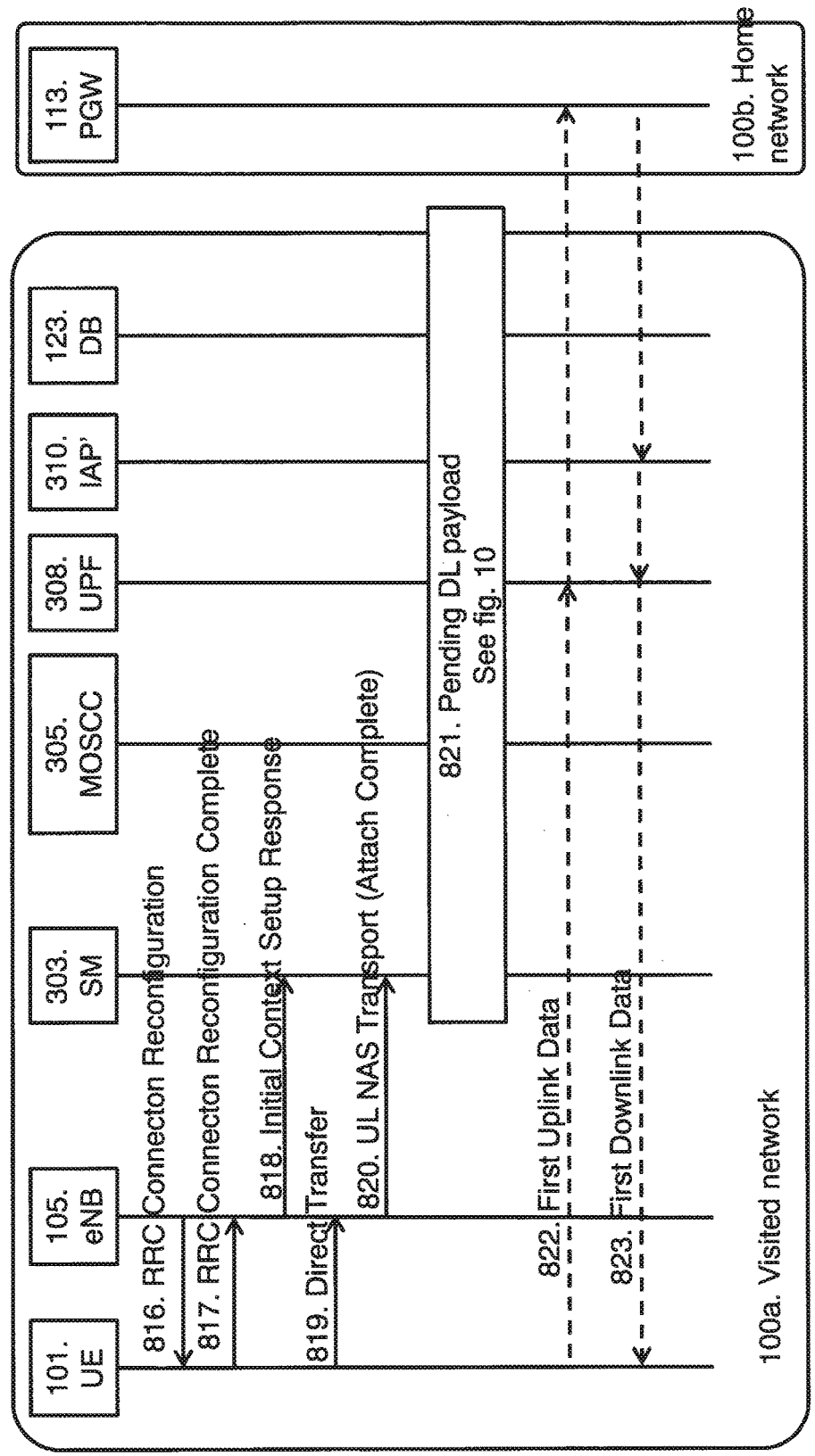

Scenario 1: Visited Network 100*a* is Based on MSC, Home Network 100*b* is Legacy EPC FIG. 8*a* and FIG. 8*b* show a UE 101 attaching to the visited network 100*a* for the first time. FIG. 8*a* comprises steps 801-815 and FIG. 8*b* comprises steps 816-824. Such attach may be referred to as an IMSI Attach. The visited network 100*a* is based on MSC and the home network 100*b* is based on EPC. The RAN node 105 is exemplified with an eNB 105 in FIGS. 8*a* and 8*b*. When the UE 101 is in a visiting network 100*a*, e.g. a VPLMN, which applies MSC, then special treatment is needed to ensure backwards compatibility with the home network 100*b*, e.g. HPLMN, applying EPC, described in box 809. The Database (DB) 123 in FIG. 8 is the same as the HSS 123 in the home network 100*b*. In FIG. 8, the control plane node 303 is represented by a SM, the service chain controller 305 is represented by a MoSCC and the address advertisement node 310 is represented by an IAP'. To differentiate between the IAPB, the IAP 310 located in the visited network 100*a* is denoted IAP" and the IAP located in the home network is denoted IAP. The method in FIG. 8 comprises at least some of the following steps, which steps may be performed in any suitable order than described below:

Step 801

Figure 2A:
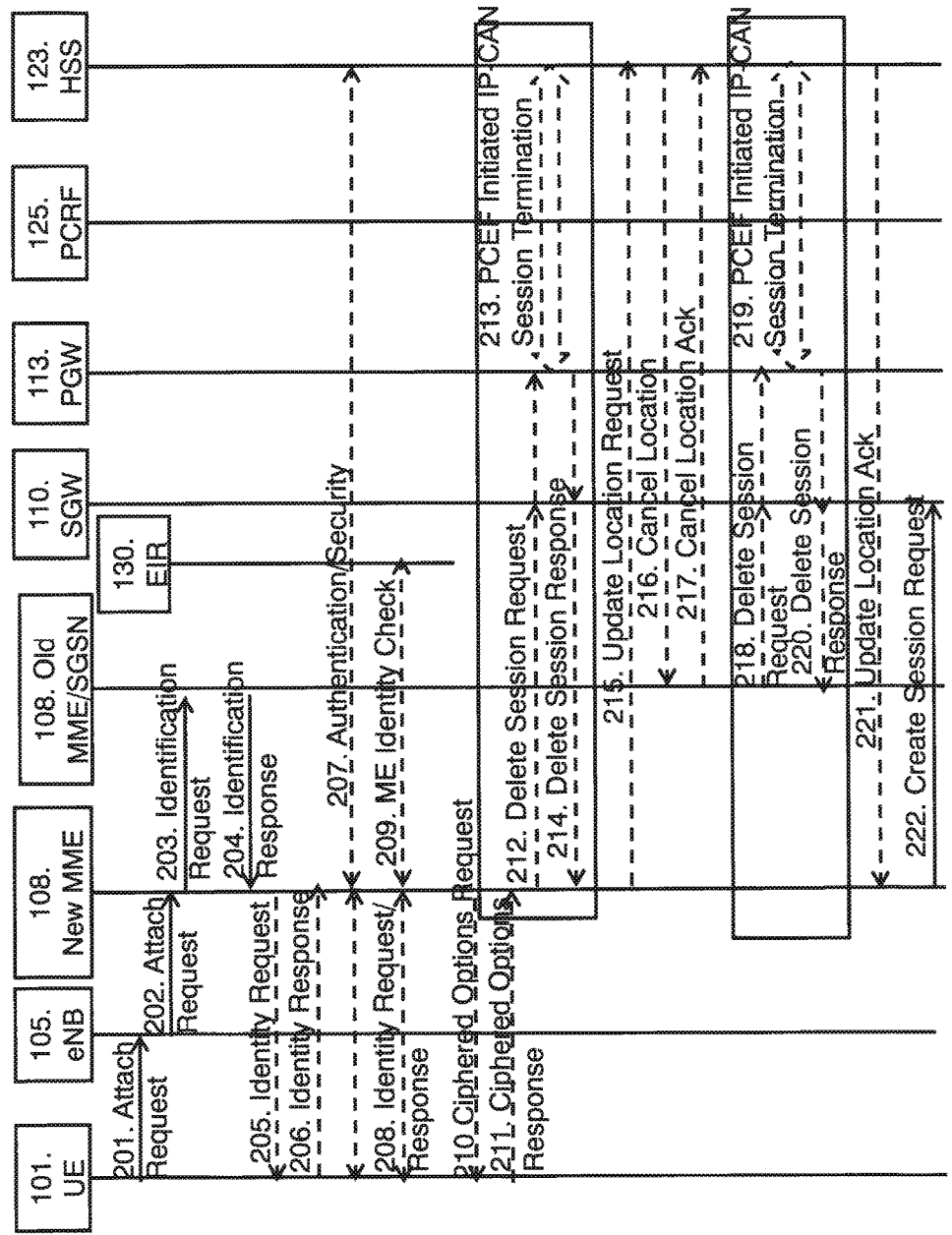
FIGS. 2a and 2b are signaling diagrams illustrating an example of an initial attach.

This step is seen in FIG. 8*a*. This step corresponds to step 201 in FIG. 2*a*. The UE 101 transmits an attach request message to the eNB 105.

Step 802

This step is seen in FIG. 8*a*. The eNB 105 transmits an initial UE message to the SM 303.

Step 803

This step is seen in FIG. 8*a*. If no UE context for the UE 101 exists anywhere in the network, if the Attach Request (sent in step 801) was not integrity protected, or if the check of the integrity failed, then authentication and NAS security setup to activate integrity protection and NAS ciphering may be executed. This step involves the UE 101, the SM 303 and the DB 123.

Step 804

This step is seen in FIG. 8*a*. The SM 303 may send an identity request message to the UE 101, and the UE 101 sends an identity response message to the Sm 303. The identity response message comprises the identity (e.g. the IMSI) of the UE 101.

Step 805

This step is seen in FIG. 8*a*. The SM 303 may send the ME Identity Check Request message to an EIR 130. The EIR 130 may respond to the Sm 303 with an ME Identity Check Ack (Result) message.

Step 806

This step is seen in FIG. 8*a*. The SM 303 may send an Update Location Request message to the DB 123.

Step 807

This step is seen in FIG. 8*a*. The DB 123 may acknowledge the Update Location message by sending an Update Location Ack message to the SM 303.

Step 808

This step is seen in FIG. 8*a*. The SM 303 applies local policies.

Step 809

This step is seen in FIG. 8*a*. This step is described in more detail in FIG. 9 below.

Step 810

This step is seen in FIG. 8*a*. The SM 303 sends a create session request message to the PGW 113 in the home network 100*b*. With the create session request message, information which indicates where downlink data should be sent to, i.e. a user plane edge point such as the IAP 310. The request message may for example comprise at least one of the address of the IAP 310 and the identity of the IAP 310.

Step 811

This step is seen in FIG. 8*a*. The PGW 113 allocates an IP address to the roaming UE 101.

Step 812

This step is seen in FIG. 8*a*. The PGW 113 sends a create session response message to the SM 303.

Step 813

This step is seen in FIG. 8*a*. The PGW 113 may send the first downlink data to the IAP" 310 (if no handover).

Step 814

This step is seen in FIG. 8*a*. The IAP 310 may send a payload notification to the SM 303.

Step 815

This step is seen in FIG. 8*a*. The SM 303 sends an initial context (attach accept), setup request to the eNB 105.

Step 816

Figure 2B:
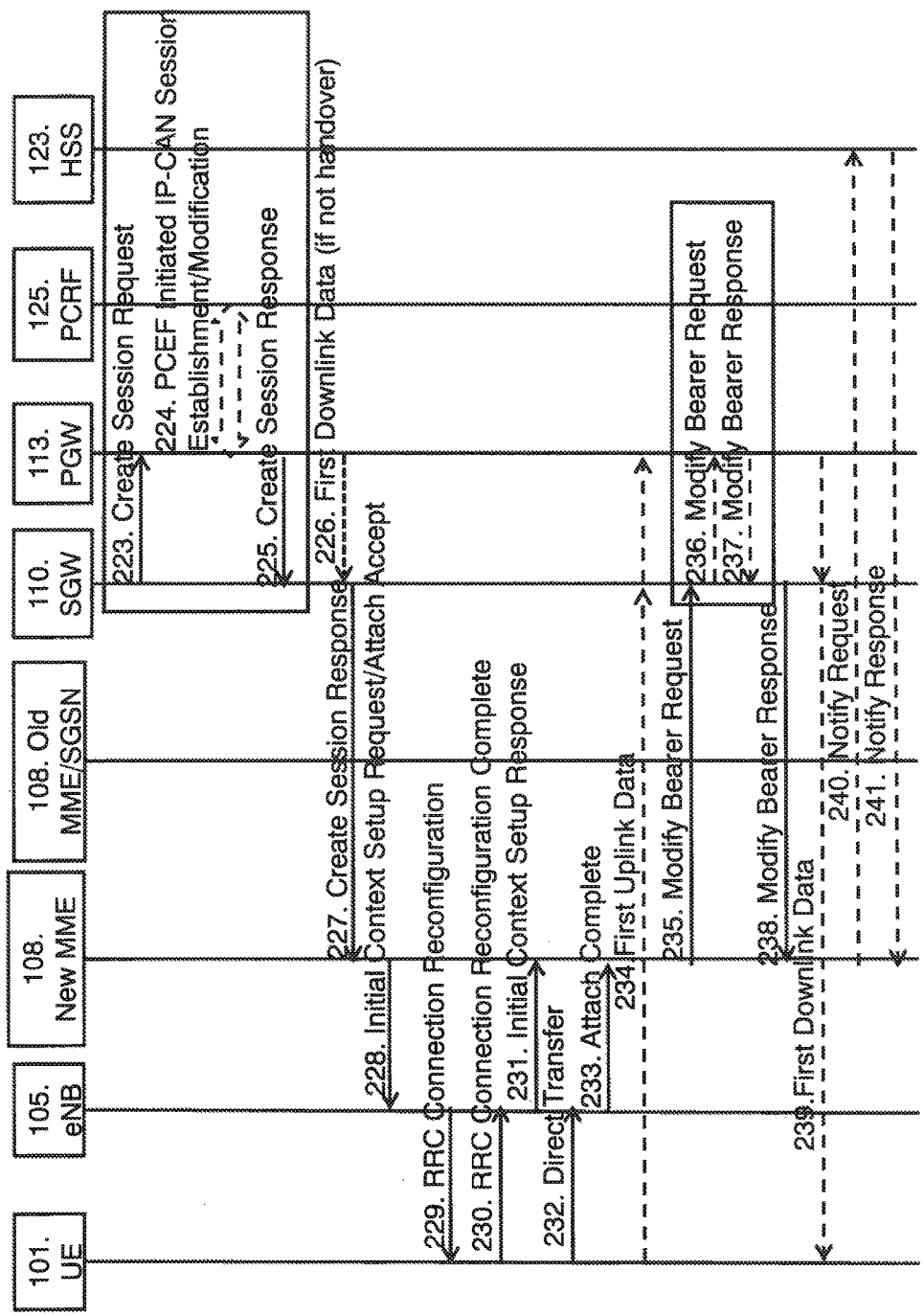

This step is seen in FIG. 8*b*. This step corresponds to step 229 in FIG. 2*b*. The eNB 105 sends an RRC Connection Reconfiguration message to the UE 101.

Step 817

This step is seen in FIG. 8*b*. This step corresponds to step 230 in FIG. 2*b*. The UE 101 sends the RRC Connection Reconfiguration Complete message to the eNB 105.

Step 818

This step is seen in FIG. 8*b*. The eNB 105 sends the Initial Context Response message to the SM 303.

Step 819

This step is seen in FIG. 8*b*. This step corresponds to step 232 in FIG. 2*b*. The UE 101 sends a Direct Transfer message to the eNB 105.

Step 820

This step is seen in FIG. 8b. The eNB 105 sends a Uplink (UL) NAS Transport message to the SM 303. This message may indicate that the attach has been completed.

Step 821

This step is seen in FIG. 8b. This step illustrates when there is pending Downlink (DL) payload waiting to be transmitted to the UE 101. This step is described in detail with reference to FIG. 10 below.

Step 822

The UE 101 may send first uplink data to the PGW 113 in the home network 100b. The first uplink data may go via at least one UPF 308 on its way to the PGW 113.

Step 823

The PGW 113 may send first downlink data to the UE 101. The first downlink data may go via the IAP' 310 and at least one UPF 308 on its way to the UE 101.

Figure 9:
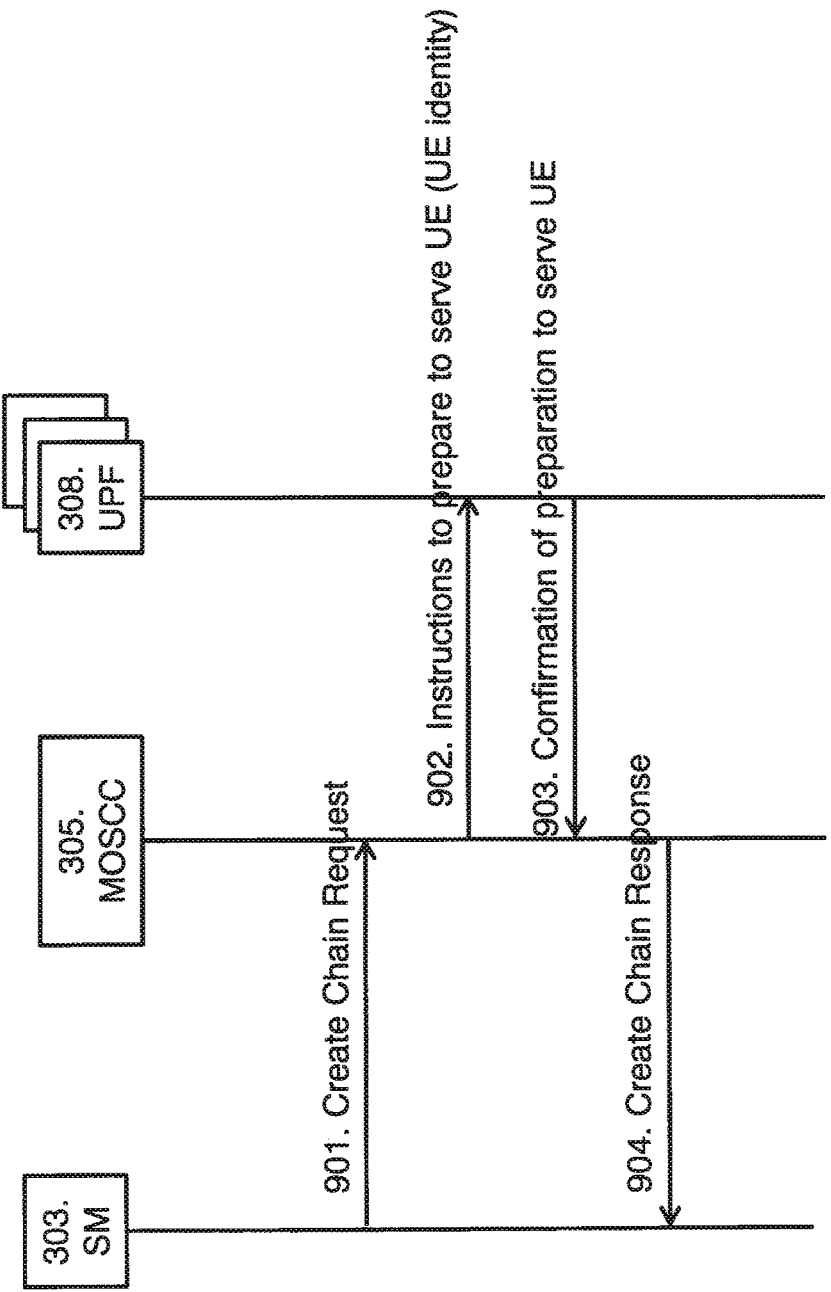
FIG. 9 is a signaling diagram illustrating embodiments of a method.

Step 809 in FIG. 8a is illustrated in more detail in FIG. 9. In particular, FIG. 9 illustrates the IMSI Attach to the VPLMN using the MSC concept. The method in FIG. 9 comprises at least some of the following steps, which steps may be performed in any suitable order than described below:

Step 901

The SM 303 sends a create chain request message to the MoSCC 305.

Step 902

The MoSCC 305 sends instructions to the UPF 308 to start to prepare to serve UE 101. The instructions may comprise the UE ID or the UE IP address may be used as a key. The UPFs 308 are configured to serve this UE 101. The instructions may be sent in a message referred to as create mobile service chain request.

Figure 12A:
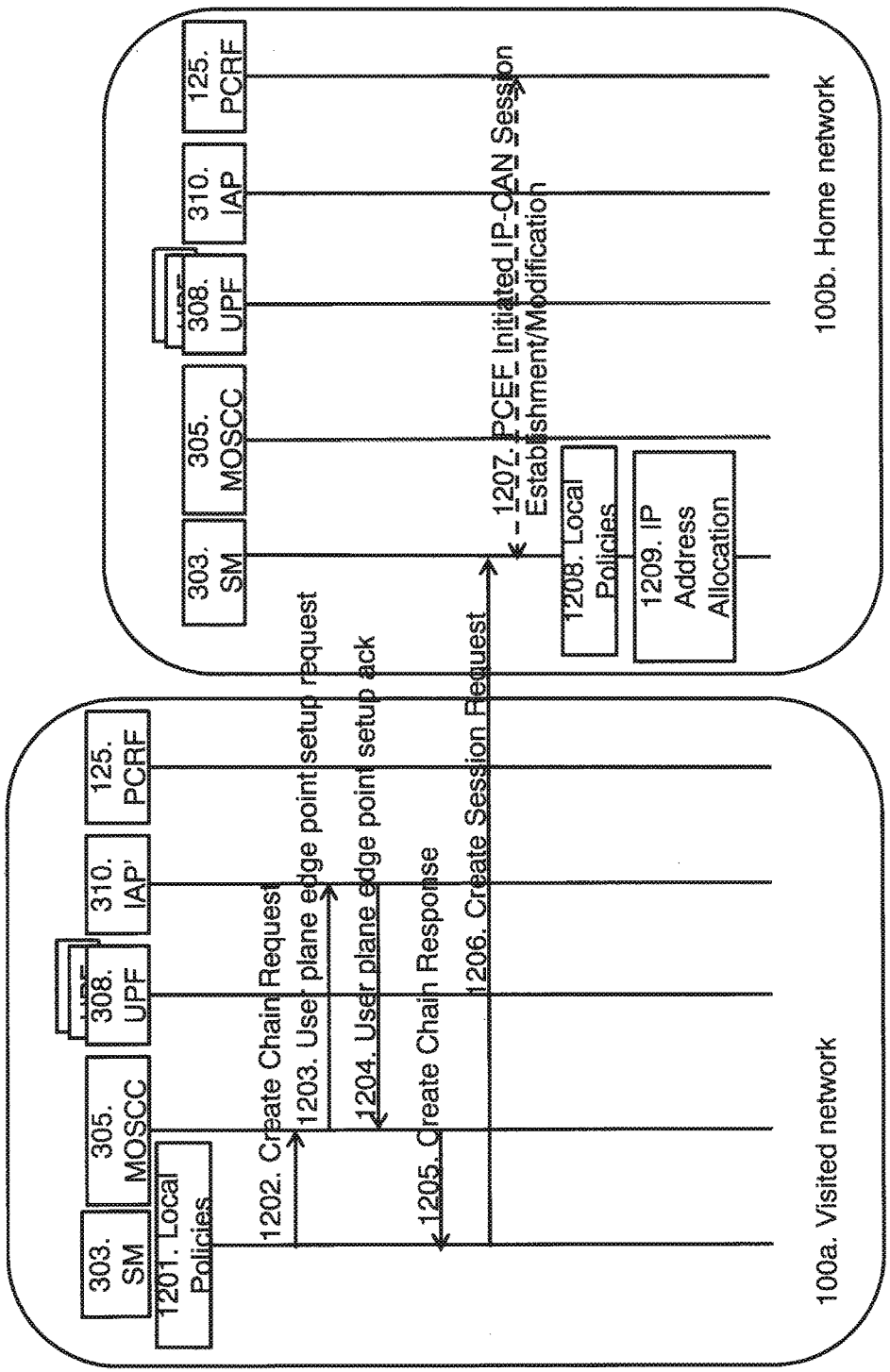
FIG. 12a, 12b are signaling diagrams illustrating embodiments of a method where both the home network and the visited network are based on MSC.

In addition to the instructions in step 902, the MoSCC 305 in the visited network 100a may send a user plane edge point setup request message to the IAP' 310 in the visited network 100a (not illustrated in FIG. 9, but it is illustrated in step 1203 in FIG. 12a). The user plane edge point setup request message is a request to setup and prepare the user plane edge point 308, 310. The IAP 310 will setup the GTP and handle the S8-U plane.

Step 903

The UPF 308 prepares to serve the UE 101 and sends a confirmation to the MoSCC 305 to confirm that they are prepared to serve the UE 101. The confirmation may be sent in a message referred to as create mobile service chain response.

The IAP' 310 in the visited network 100a may also send a user plane edge point setup response message to the MoSCC 305 in the visited network 100a (this step is not illustrated in FIG. 9, but it is illustrated in step 1204 in FIG. 12a). Information about IP address and Tunnel Endpoint IDentifier (TEID) associated with the UE 101 is comprised in the response message. The user plane edge point setup response message indicates that the user plane edge point has been setup.

Step 904

The MoSCC 305 sends a create chain response message to the SM 303. With this response message, the SM 303 knows that the chain has been created. The create chain response message may comprises information which indicates the at least one of the address and identifier of the user plane edge point 308, 310 in the network in which the SM 303 is comprised and which the user plane packets should travers in the created chain. The user plane edge point 308, 310 may be at least one of an IAP' 310 or one or more UPFS 308.

Figure 10:
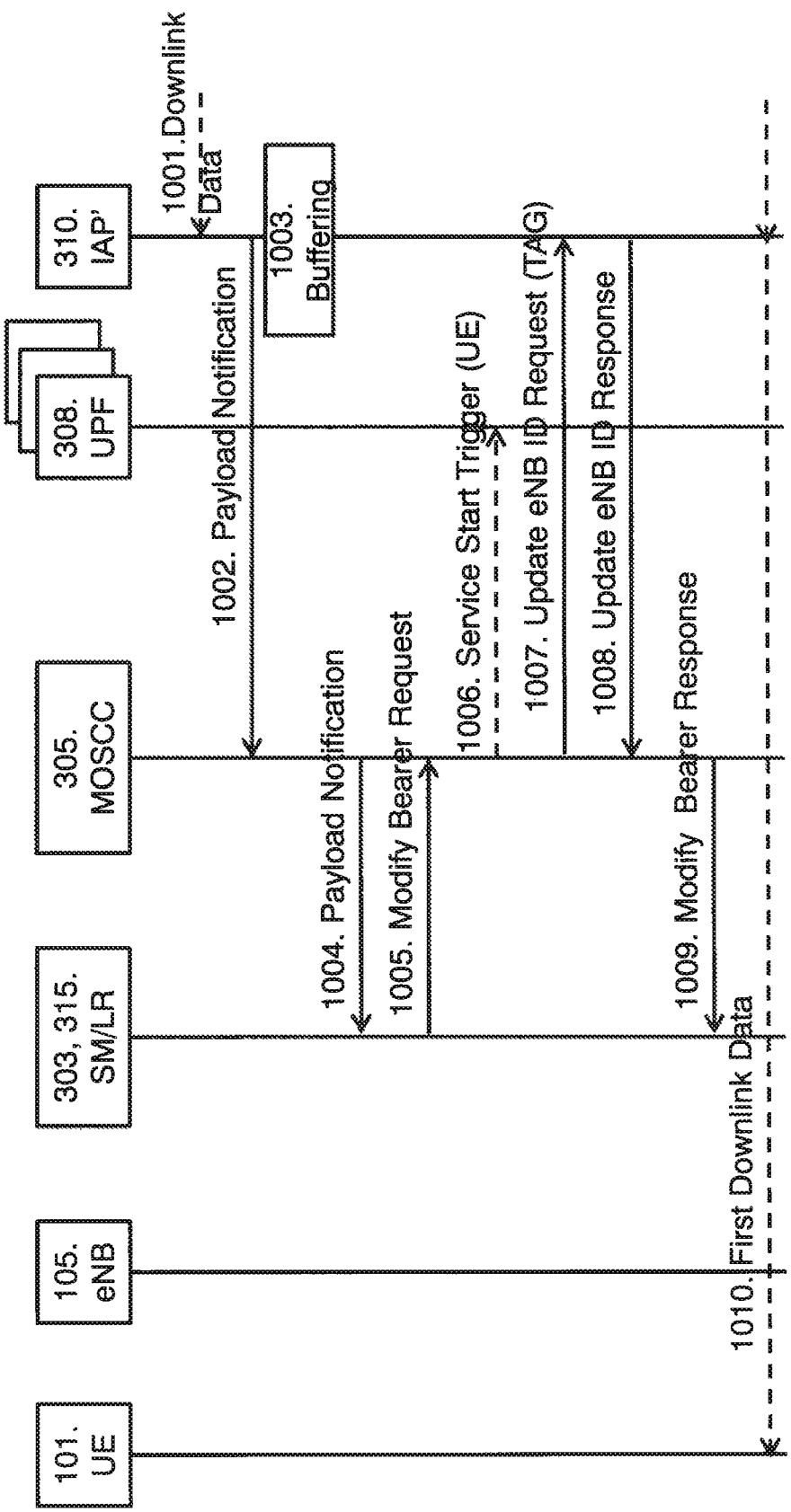
FIG. 10 is a signaling diagram illustrating embodiments of a method.

Step 822 in FIG. 8b will now be described in more detail. FIG. 10 illustrates step 822 in more detail and illustrates downlink traffic for a UE 101 in connected mode using the Mobile Service Chaining concept. In FIG. 10, the SM 303 and the LR 315 are co-located in one node. The RAN node 105 is exemplified with an eNB 105 in FIG. 10. The method illustrated in FIG. 10 comprises at least some of the following steps, which steps may be performed in any suitable order than described below:

Step 1001

Downlink data to be delivered to and address (e.g. the IP address of the UE 101) is received at the IAP' 310. The IAP 310 may check if the IP address of the UE 101 is included in an already existing service chain.

Step 1002

The IAP 310 sends a payload notification message to the MoSCC 305. The payload notification informs the MoSCC 305 about that there is downlink data to be delivered to an address, e.g. the IP address of the UE 101. The IAP 310 is located in the downlink direction.

Step 1003

The IAP 310 buffers the downlink data.

Step 1004

The MoSCC 305 sends a payload notification message to the SM/LR 303, 315. The payload notification transmitted to the SM/LR 303, 315 may comprise a request for the location of the UE 101.

Step 1005

The SM/LR 303, 315 sends a modify bearer request message to the MoSCC 305. The modify bearer request message may comprise the address of the UE 101 which was requested in step 1004.

Step 1006

The MoSCC 305 may send a Service Start Trigger message to the UPF 308. The service start trigger message may comprise the identity of the UE 101.

Step 1007

The MoSCC 305 may send an Update eNB ID Request message to the IAP' 310. The Update eNB ID request message may comprise the address of the eNB 105 for the payload. The address may be seen as a tag.

Step 1008

The IAP' 310 may send an Update eNB ID Response to the MoSCC 305 which acknowledges the receipt of the request message in step 1007.

Step 1009

The MoSCC 305 sends a Modify Bearer Response message to the SM, LR 303, 315 which is a response to the request message in step 1005.

Step 1010

The first downlink data is transmitted from the IAP' 310 to the UE 101.

Scenario 2: Home Network 100b and Visited Network 100a are Both Based on MSC

Figure 11:
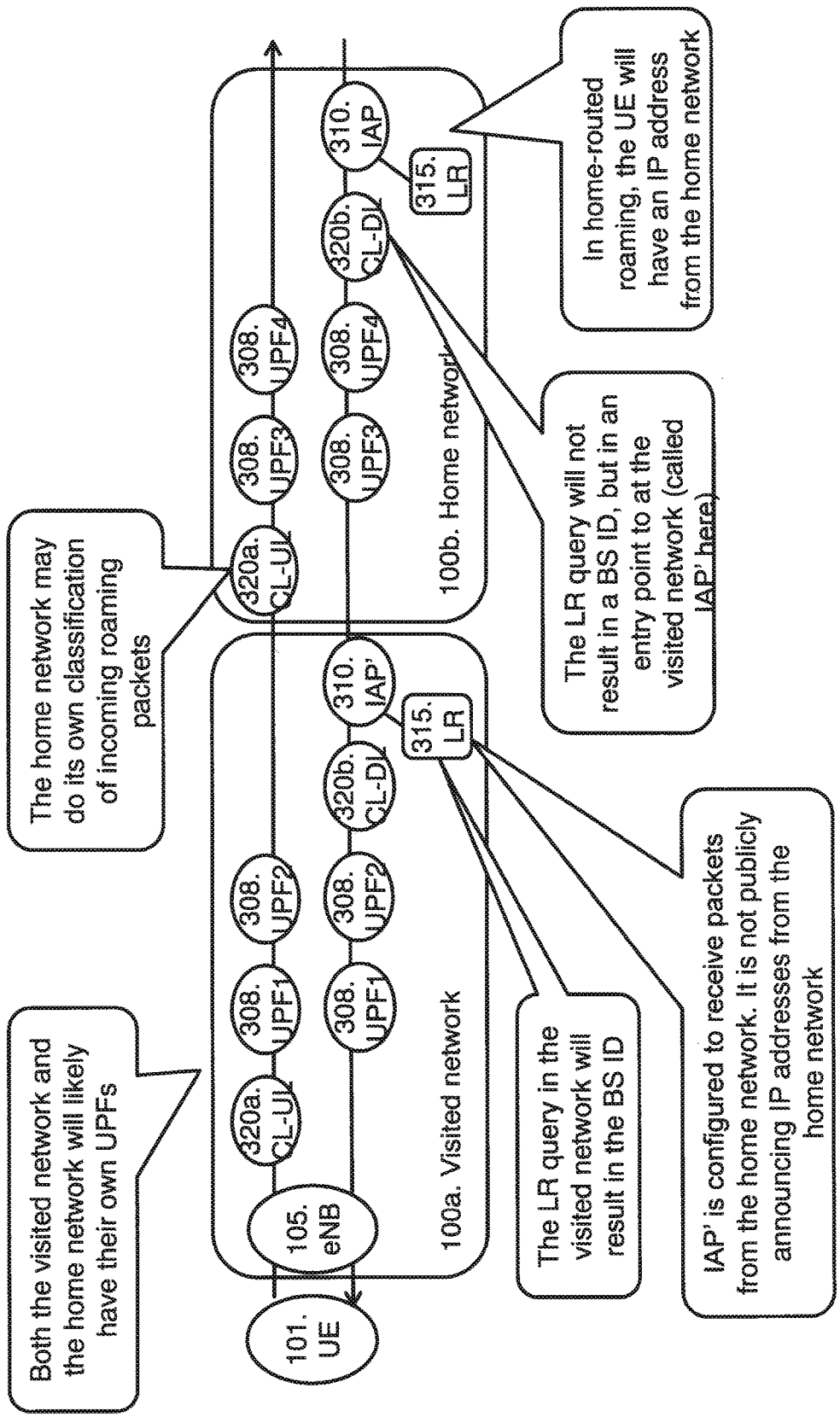
FIG. 11 is a schematic block diagram illustrating embodiments of a communications system.

FIG. 11 illustrates an example when both the home network 100b and the visited network 100a are based on MSC, i.e. scenario 2. The RAN node 105 is exemplified with an eNB 105 in FIG. 11. In FIG. 11, both the visited network 100a and the home network 100b may have their own UPFs 308. The LR query in the visited network 100a will result in a location ID such as e.g. a BS ID. The IAP' 310 is configured to receive packets from the home network 100b. It is not publicly announcing IP addresses from the home network 100b. The home network 100b may do its own classification of incoming roaming packets. The LR query will not result in a location ID in the home network 100b, but in a user plane edge point to at the visited network 100a (called IAP' 310 in FIG. 11). The user plane edge point 308, 310 may be an entry point or an exit point. In home-routed roaming, the UE 101 will have an IP address from the home network 100b.

In the roaming case, the home network 100b does not know the location of the UE 101 in the visited network 100a. The home network 100b only knows that this is a roaming case. To solve this, the LR 315 of the home network 100b does not store a location but a user plane edge point 308, 310 in the visited network 100a. This user plane edge point 308, 310 is denoted with IAP' 310 in the FIG. 11. The actual value of such user plane edge point 308, 310 in the LR 315 may be an IP address, a Domain Name Server (DNS) name of the IAP' 310, etc. When the packet traverses the classifier(s) 320 and UPF(s) 308 in the home network 100b, the packet does not carry a tag with a location ID such as e.g. a BS ID as described earlier, but a tag with the user plane edge point 308, 310 in the visited network 100a. At the end of the chain in the home network 100b this user plane edge point 308, 310 may be used to forward to the correct visited network 100a.

The IAP' 310 user plane edge point 308, 310 may be similar to an ordinary IAP 310 in the non-roaming case. One difference may be that no IP address range is announced outwards. Only a lookup is made to the LR 315 (in the visited network 100a), in order to find out the actual location of the UE 101. The rest of the procedure is as described above.

Multiple IAP' instances may be involved in a roaming scenario between a particular visited network 100a and a particular home network 100b. Exactly which IAP' 310 instance to use for this UE 101 may be based on pre-configuration or dynamic negotiation when the UE 101 attaches. It is also possible that multiple IAP' 310 instances are used for a single UE 101. Depending on aspects like network topology or real-time load balancing a particular IAP' 310 instance is chosen.

The IAP' 310 is the user plane edge point 308, 310 (e.g. an entry point) in the downlink direction. Similarly, in the uplink, a user plane edge point 308, 310 (e.g. an entry point) is needed. In general, a UPF 308 in the home network 100b may be the uplink user plane edge point 308, 310 (e.g. an entry point). In the example FIG. 11, this UPF 308 is an uplink classifier 320a.

Figure 12B:
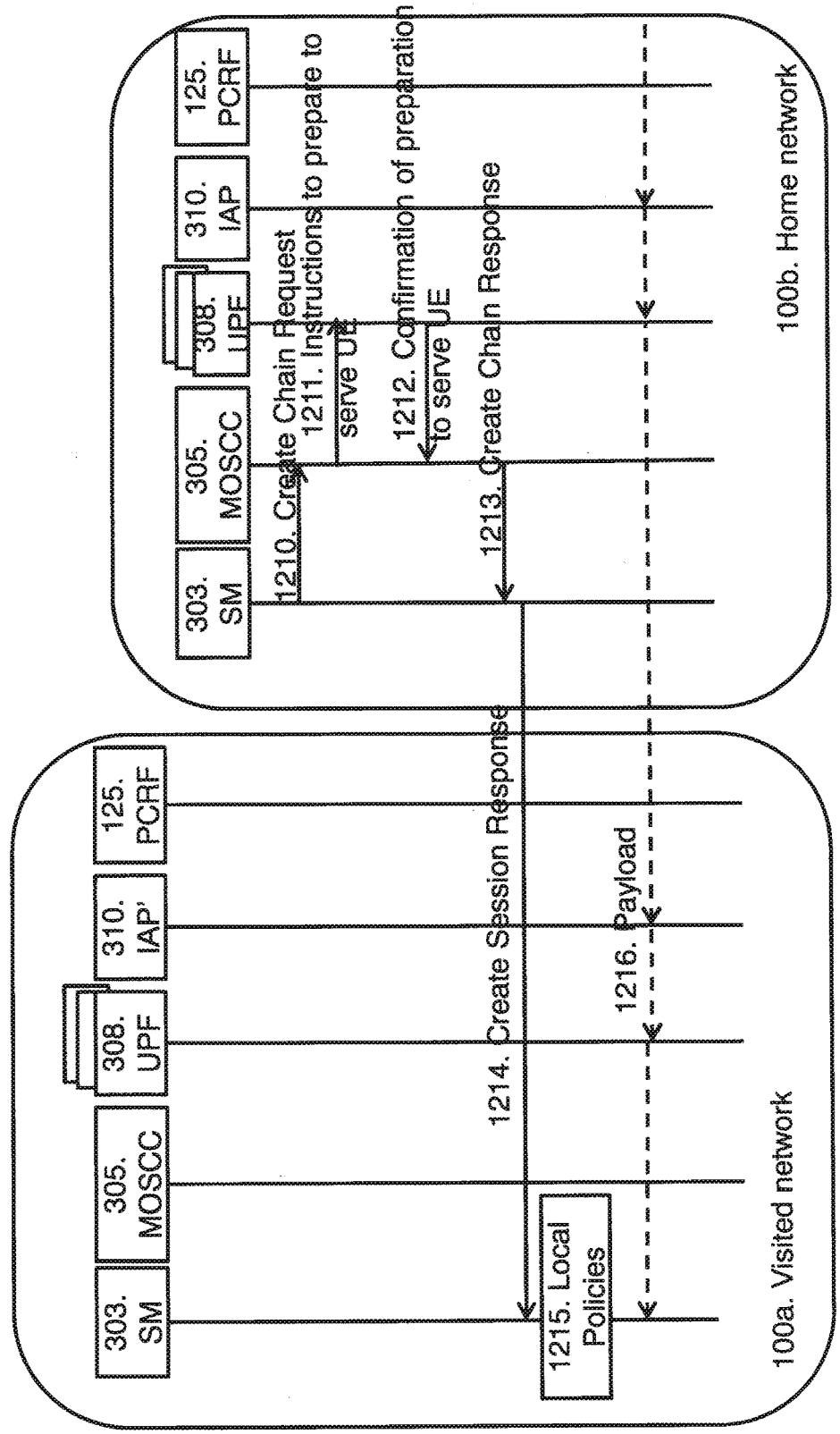

FIGS. 12a and 12b are signaling diagrams illustrating an example of the initial attach where both the home network 100b and the visited network 100a are based on MSC (scenario 1). In FIG. 12a and FIG. 12b, the control plane node 303 is represented by a SM, the service chain controller 305 is represented by a MoSCC and the address advertisement node 310 is represented by an IAP 310. FIG. 12a comprises steps 1201-1209 and FIG. 12b comprises steps 1210-1215.

The Create Session procedure between the home network 100b and the visited network 100a is GTP based in order to be backwards compatible. Although not shown in FIGS. 12a and 12b, there might be a capability exchange between the different networks 100a, 100b opening up for other ways to establish the connection between the visited network 100a and the home network 100. It might also be negotiated between operators in the Service Level Agreement (SLA), and then configured in the SM 303, based on the PLMN, which architecture to use. If it is known from the capability information that both networks are based on MSC, then the Create Session Request does not need to be GTP-based. FIGS. 12a and 12b use the example where the Create Session Request is GTP-based.

The method exemplified in FIGS. 12a and 12b comprises at least some of the following steps, which steps may be performed in any suitable order than described below:

Step 1201

This step is seen in FIG. 12a. The SM 303 in the visited network 100a has local policies. The local policies may be roaming policies regarding QoS, the amount of bandwidth that is allowed for the roaming subscriber(s) so that the SLA is not broken. If no PCRF exist, then these QoS limits also need to be set, e.g. they are set locally. In some embodiments, either step 1207 is performed or step 1208 is performed. In other embodiments, both steps 1207 and 1208 are performed.

Step 1202

This step is seen in FIG. 12a. The SM 303 in the visited network 100a sends a create chain request message to the MoSCC 305 in the visited network 100a.

Step 1203

This step is seen in FIG. 12a. The MoSCC 305 in the visited network 100a sends a user plane edge point setup request message to the IAP' 310 in the visited network 100a. The user plane edge point setup request message is a request to setup and prepare the user plane edge point 308, 310. The IAP' 310 will setup the GTP and handle the S8-U plane.

The MoSCC 305 may also send instructions to the UPF 308 to prepare for serving the UE 101. A UPF 308 may be configured with some information about the UE 101 in order to perform its task (e.g. a bandwidth limiter UPF needs to get configured with the max bandwidth of this particular UE 101). This step is not illustrated in FIG. 12, but it is illustrated in step 902 FIG. 9. In some embodiments, the instructions to the UPF 308 to prepare for serving the UE 101 is sent together with the user plane edge point setup request message. In other embodiments, the instruction to prepare and the user plane edge point setup request message are separate messages.

Step 1204

This step is seen in FIG. 12a. The IAP' 310 in the visited network 100a sends a user plane edge point setup response message to the MoSCC 305 in the visited network 100a. Information about IP address and TEID associated with the UE 101 is comprised in the response message. The user plane edge point setup response message indicates that the user plane edge point has been setup.

The MoSCC 305 may also send a response to the instructions to the UPF 308 to prepare for serving the UE 101. This step is not illustrated in FIG. 12, but it is illustrated in step 903 in FIG. 9. In some embodiments, the response to the instructions to the UPF 308 to prepare for serving the UE 101 is sent together with the user plane edge point setup response message. In other embodiments, the response to instructions to prepare and the user plane edge point setup response message are separate messages.

Step 1205

This step is seen in FIG. 12a. The MoSCC 305 in the visited network 100a sends a create chain response message to the SM 303 in the visited network 100a. The create chain response message is a response to the request message in step 1202. The response message comprises the information about IP address and TEID associated with the user plane edge point 308, 310. In other words, information (e.g. IP address) for the UPF 308 in the visited network 100a that will receive downlink data from the home network 100b.

Step 1206

This step is seen in FIG. 12a. The SM 303 in the visited network 100a sends a create session request message to the SM 303 in the home network 100b. Information about the IP address and TEID associated with the UE 101 is included in the Create Session Request message towards the home network 100*b*.

Either the visited network 100*a* selects the user plane edge point 308, 310 (in that case only a single edge point is sent in step 1206), or the visited network 100*a* sends multiple possible user plane edge points 308, 310 to the home network 100*b* in step 1206 (in that case the home network 100*b* selects the user plane edge point 308, 310).

Step 1207

This step is seen in FIG. 12*a*. This step is performed if there is an external PCRF 125. The dotted arrow indicates that this is an optional step. A PCEF initiated IP-CAN Session Establishment/Modification procedure takes place between the SM 303 in the home network 100*b* and the PCRF 125 in the home network 100*b*. If there is no external PCRF 125, this procedure in step 1207 is handled inside the SM 303.

Step 1208

This step is seen in FIG. 12*a*. The SM 303 in the home network 100*b* applies local policies.

Step 1209

This step is seen in FIG. 12*a*. The SM 303 in the home network 100*b* allocates an IP address for the UE 101. The IP address may be allocated using a local IP address pool.

The allocation of the IP address may be coordinated with the IAP 310 in the home network 100*b*. The IP address which is allocated in step 1209 is the is the UE IP Address for this PDN Connection. This IP address may be referred to as an End User Address.

Step 1210

This step is seen in FIG. 12*b*. The SM 303 in the home network 100*b* sends a create chain request message to the MoSCC 305 in the home network 100*b*. The MoSCC 305 in the home network 100*b* creates the chain as requested.

Step 1211

This step is seen in FIG. 12*b*. The MoSCC 305 in the home network 100*b* sends instructions to the UPF 308 in the home network 100*b* to prepare to serve the UE 101. These instructions may be transmitted in a message which may be referred to as a create mobile service chain request message.

The UPFs 308 are configured to serve this UE 101. The UE ID or UE IP address may be used as key. The egress, peer UPF 308 in the chain is configured to handle S8-U, IP Address and TEID information is sent back to the SM 303.

Step 1212

This step is seen in FIG. 12*b*. The UPF 308 in the home network 100*b* sends a confirmation to the MoSCC 305 in the home network 100*b* of that the UPF 308 is now prepared to serve the UE 101. The confirmation may be transmitted in a message which may be referred to as a create mobile service chain response message.

Step 1213

This step is seen in FIG. 12*b*. The MoSCC 305 in the home network 100*b* sends a Create Chain Response message to the SM 303 in the home network 100*b*. This response message is a response to the request message in step 1210. The response message comprises information which indicates that the chain has been created.

Step 1214

This step is seen in FIG. 12*b*. The SM 303 in the in the home network 100*b* sends a create session response message to the SM 303 in the visited network 100*a*. The response message is a response to the request message in step 1206 which is seen in FIG. 12*a*.

Step 1215

This step is seen in FIG. 12*b*. The SM 303 in the visited network 100*a* applies local policies.

Step 1216

Payload is transmitted to the UE 101 which roams into the visited network 100*a*. The payload is transmitted via the IAP 310 in the home network 100*b*, the UPF 308 in the home network 100*b*, the IAP' 310 in the visited network, the UPF 308 in the visited network and the SM 303 in the visited network 100*a* before reaching the UE 101.

Finding Uplink and Downlink User Plane Edge Points

How to find that uplink user plane edge point (e.g. an entry point) can be performed in a similar way as in today's EPC architecture. 3GPP TS 23.401, V13.2.0, Chapter 4.3.8.1, regarding Roaming setup using the S8 interface reads:

"The PDN GW domain name shall be constructed and resolved by the method described in 3GPP TS 29.303, which takes into account any value received in the APN-OI Replacement field for home routed traffic. Otherwise, or when the resolution of the above PDN GW domain name fails, the PDN GW domain name shall be constructed by the serving node using the method specified in Annex A of 3GPP TS 23.060 and clause 9 of 3GPP TS 23.003. If the Domain Name Service function provides a list of PDN GW addresses, one PDN GW address is selected from this list. If the selected PDN GW cannot be used, e.g. due to an error, then another PDN GW is selected from the list. The specific interaction between the MME/SGSN and the Domain Name Service function may include functionality to allow for the retrieval or provision of additional information regarding the PDN GW capabilities (e.g. whether the PDN GW supports PMIP-based or GTP-based S5/S8, or both)."

With the above information the visited network 100*a* knows the PGW 113 address in the home network 100*b* and the Create Session Request procedure can be started.

Finding the user plane edge point 308, 310 (e.g. the entry point) in the other direction; i.e. finding the IAP' 310 in the visited network 100*a* by the home network 100*b* can be performed in a similar way. With the difference that, due to the anchorless concept, one out of many IAPs 310 can be chosen on a per-packet basis. This is different from the current EPC's PGW 113 selection mechanism where is PGW 113 is selected one upon PDN connection setup. Several options are possible:

If the visited network 100*a* is aware that the home network 100*b* is based on MSC (see previous section), then it may inform in the Create Session Request which IAP' 310, or set of IAP's 310, the home network 100*b* shall use for downlink traffic. If a set of IAP's 310 is provided, then the home network 100*b* may be allowed to pick any of those for downlink traffic. The selection may be made one, or may even be made on a per-packet basis just as in the basic mobile service chaining concept.

If the visited network 100*a* is not aware of the home network 100*b* being based on MSC or not, then the Create Session Request sent by the VPLMN would be a Create Session Request as if the visited network 100*a* would be based on legacy EPC. In other words, the visited network 100*a* acts as if it would be legacy EPC. This brings us to scenario 2 in the next section.

Figure 13:
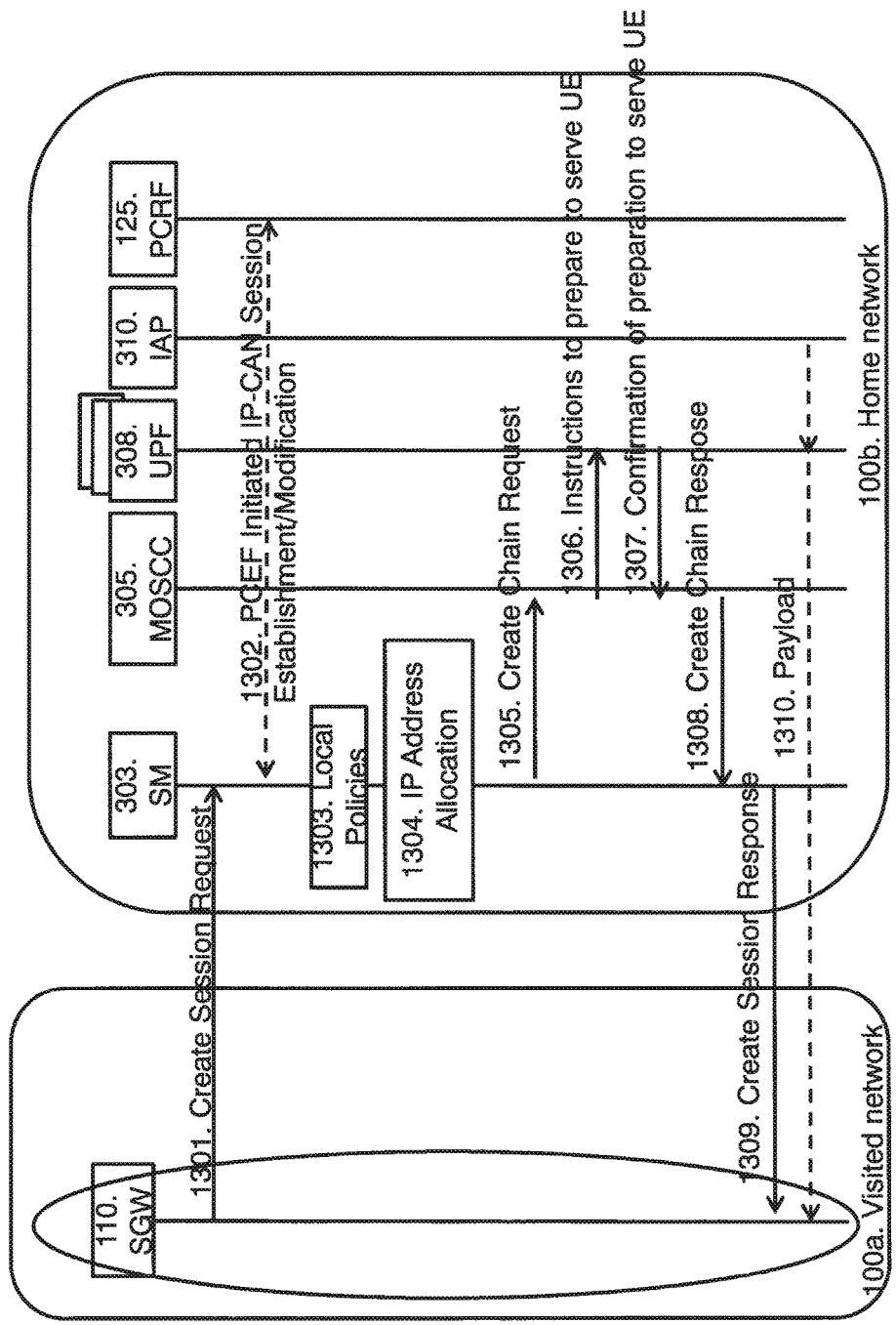
FIG. 13 is a signaling diagram illustrating embodiments of a method where the home network is based on MSC and the visited network is a legacy EPC network.

Scenario 3: Home Network 100*b* is Based on MSC and Visited Network 100*a* is Legacy EPC What has not been described in the previous scenario is how the user plane traffic is carried between the home network 100*b* and the visited network 100*a*. Assuming that the visited network 100*a* in the previous scenario is legacy EPC. This brings us to scenario 2. In such scenario, the user plane traffic to/from the visited network 100*a* will be GTP-based. FIG. 13 shows an example of an initial attach for scenario 2. In FIG. 13, the visited network 100*a* which is a legacy EPC network comprises a SGW 110. The SGW 110 is an entity which needs to be visible for roaming cases and migration. The signaling flows are valid for a visiting UE 101 using a SGW 110 in the visited network 100*a*. FIG. 13 illustrates an example of a signaling flow for scenario 2 during an initial attach. The method exemplified in FIG. 12 comprises at least some of the following steps, which steps may be performed in any suitable order than described below:

Step 1301

The SGW 110 in the visited network 100*a* sends a create session request message to the SM 303 in the home network 100*b*.

Step 1302

This step corresponds to step 1207 in FIG. 12*a*. This step is performed if there is an external PCRF 125. The dotted arrow indicates that this is an optional step. A PCEF initiated IP-CAN Session Establishment/Modification procedure takes place between the SM 303 in the home network 100*b* and the PCRF 125 in the home network 100*b*. If there is no external PCRF 125, this procedure in step 1302 is handled inside the SM 303.

Step 1303

This step corresponds to step 1208 in FIG. 12*a*. The SM 303 in the home network 100*b* applies local policies.

Step 1304

This step corresponds to step 1209 in FIG. 12*a*. The SM 303 in the home network 100*b* allocates an IP address. The IP address may be allocated using a local IP address pool. The allocation of the IP address may be coordinated with the IAP 310 in the home network 100*b*.

Step 1305

This step corresponds to step 1210 in FIG. 12*b*. The SM 303 in the home network 100*b* sends a create chain request message to the MoSCC 305 in the home network 100*b*. The MoSCC 305 in the home network 100*b* creates the chain as requested.

Step 1306

This step corresponds to step 1211 in FIG. 12*b*. The MoSCC 305 in the home network 100*b* sends instructions to the UPF 308 in the home network 100*b* to prepare to serve the UE 101. These instructions may be transmitted in a message which may be referred to as a create mobile service chain request message.

The UPFs 308 are configured to serve this UE 101. The UE ID or UE IP address may be used as key. The egress, peer UPF 308 in the chain is configured to handle S8-U, IP Address and TEID information is sent back to the SM 303.

Step 1307

This step corresponds to step 1212 in FIG. 12*b*. The UPF 308 in the home network 100*b* sends a confirmation to the MoSCC 305 in the home network 100*b* of that the UPF 308 is now prepared to serve the UE 101. The confirmation may be transmitted in a message which may be referred to as a create mobile service chain response message.

Step 1308

This step corresponds to step 1213 in FIG. 12*b*. The MoSCC 305 in the home network 100*b* sends a Create Chain Response message to the SM 303 in the home network 100*b*. This response message is a response to the request message in step 1305. The response message comprises information which indicates that the chain has been created.

Step 1309

The SM 303 in the home network 100*b* sends a create session response message to the SGW 110 in the visited network 100*a*. This response message is a response to the request message in step 1301.

Step 1310

Downlink payload is sent via the IAP 310 and UPFs 308 in the home network 100*b* to the SGW 110 in the visited network 100*a* for further transmission to the UE 101 which visits the visited network 100*a*.

Figure 14:
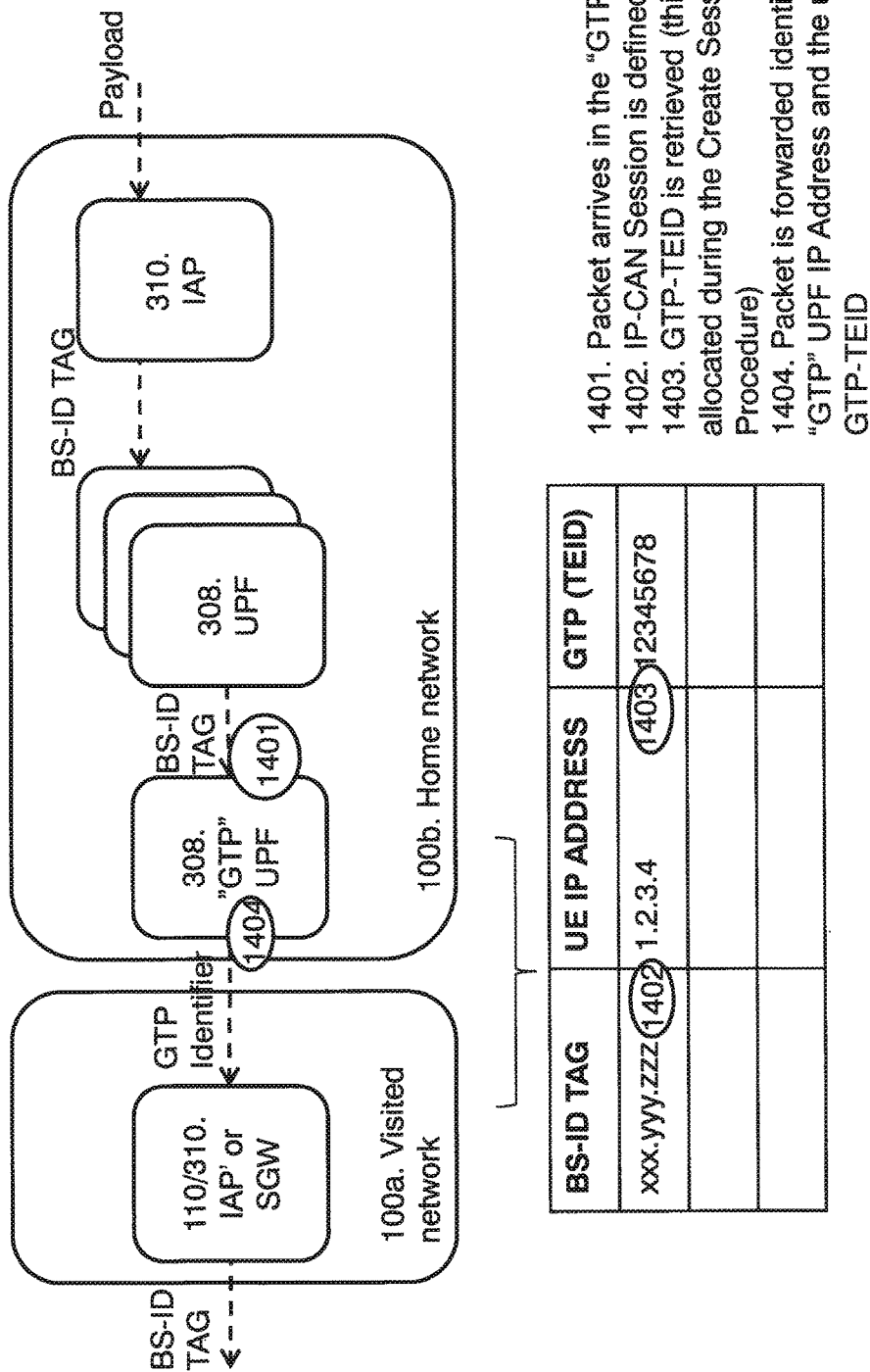
FIG. 14 is a schematic block diagram illustrating embodiment of conversion of a payload.

Note that one of the UPFs 308 in FIG. 13 need to cater for the GTP communication (similar to S8-U). In the uplink, a UPF 308 in the home network 100*b* may need to convert the incoming GTP-U packets to an encapsulation for MSC. This can be performed by a special UPF 380 dedicated for this purpose. This UPF 308 may be denoted as the CL-UL in FIGS. 7 and 11. The converter and the CL may be the same UPF or they may be different UPFs. The task of this classifier may be to strip the GTP-U header from the incoming packet, to classify the packet, such that a new service-chaining header can be added to the packet. FIG. 14 illustrates an example of the re-mapping of a BS-ID TAG to a GTP unique identifier. The payload enters the IAP 310 in the home network 100*b* which is based on MSC. The IAP 310 in the home network 100*b* applies a BS-ID tag (e.g. xxx.yyy.zzz) to the payload. The BS-ID tag (e.g. xxx.yyy.zzz) may be seen as a MSC specific tag. The BS-ID tag (e.g. xxx.yyy.zzz) is transmitted to the UPF 308 in the home network 100*b*. The packet arrives in the "GTP" UPF in the home network (step 1401). The IP-CAN Session (e.g. 1.2.3.4) is defined by the "GTP" UPF (step 1402). The GTP-TEID (e.g. 12345678) is retrieved by the "GTP" UPF (step 1403). The GTP-TEID may be allocated during the Create Session Procedure. The packet is forwarded from the "GTP" UPF in the home network 100*b* to the IAP' or SGW 110 in the visited network 100*a* (step 1404). The packet is identified by the "GTP" UPF IP address (e.g. 1.2.3.4) and the unique GTP-TEID (e.g. 12345678).

Similarly, in the downlink, a UPF 308 in the home network 100*b* may need to convert outgoing packets to GTP-U packets.

Figure 15:
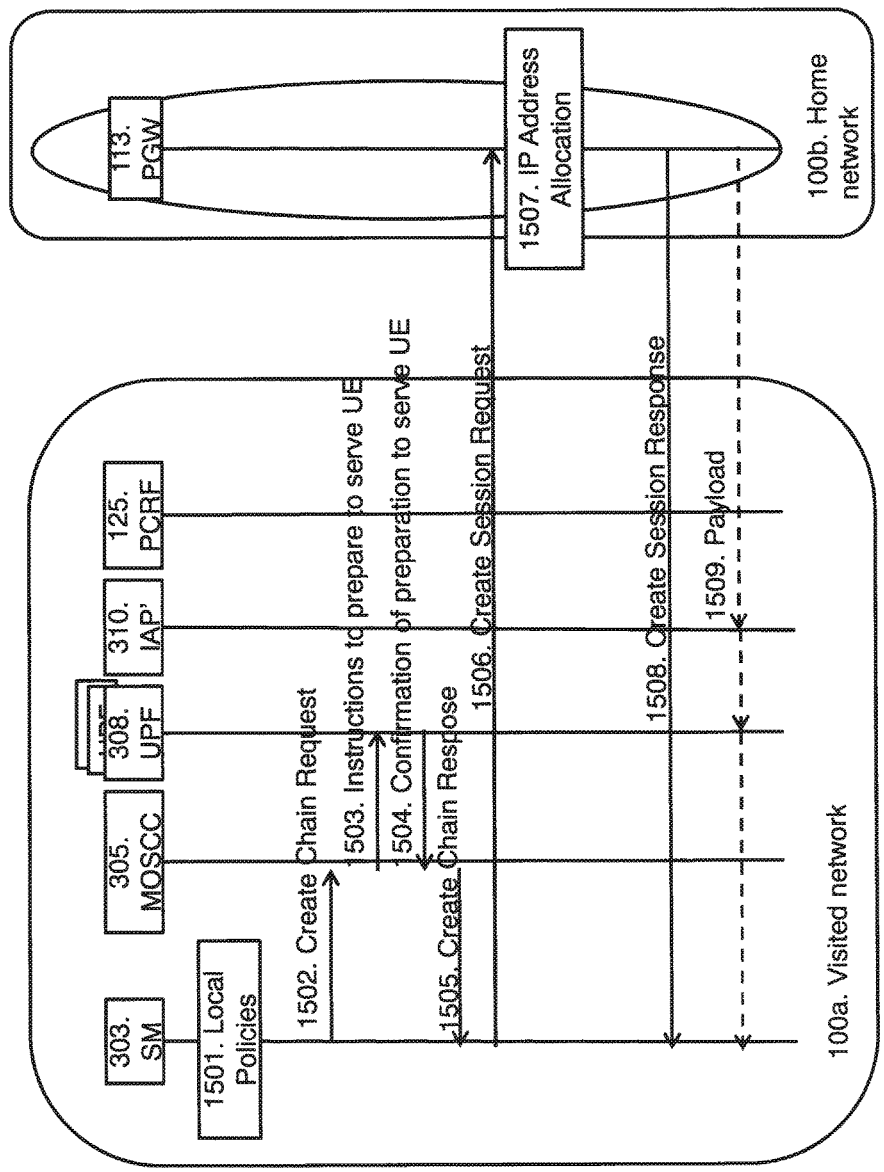
FIG. 15 is a signaling diagram illustrating embodiments of a method where the visited network is based on MSC and the home network is a legacy EPC network.

FIG. 15 illustrates an example of an initial attach where the visited network 100*a* is based on MSC and the home network 100*b* is a legacy EPC network, i.e. scenario 1. The signaling flow in FIG. 15 is valid for a visitor using a PGW function in its home network 100*b*. The method exemplified in FIG. 15 comprises at least some of the following steps, which steps may be performed in any suitable order than described below:

Step 1501

This step corresponds to step 1201 in FIG. 12*a*. The SM 303 in the visited network 100*a* applies local policies.

Step 1502

This step corresponds to step 1202 in FIG. 12*b*. The SM 303 in the home network 100*b* sends a create chain request message to the MoSCC 305 in the home network 100*b*. The MoSCC 305 in the home network 100*b* creates the chain as requested.

Step 1503

This step corresponds to step 1203 in FIG. 12*a*. The MoSCC 305 in the home network 100*b* sends instructions to the UPF 308 in the home network 100*b* to prepare to serve the UE 101. These instructions may be transmitted in a message which may be referred to as a create mobile service chain request message. Similar to as described in step 902 in FIG. 9 and step 1203 in FIG. 12*a*, the MoSCC 305 may also send a user plane edge point setup request message (not illustrated in FIG. 15).

The UPFs 308 are configured to serve this UE 101. The UE ID or UE IP address may be used as key. The egress, peer UPF 308 in the chain is configured to handle S8-U, IP Address and TEID information is sent back to the SM 303.

Step 1504

This step corresponds to step 1204 in FIG. 12*a*. The UPF 308 in the home network 100*b* sends a confirmation to the MoSCC 305 in the home network 100*b* of that the UPF 308 is now prepared to serve the UE 101. The confirmation may be transmitted in a message which may be referred to as a create mobile service chain response message. Similar to as described in step 903 in FIG. 9 and step 1204 in FIG. 12*a*, the MoSCC 305 may also send a user plane edge point setup response message (not illustrated in FIG. 15).

Step 1505

This step corresponds to step 1205 in FIG. 12*b*. The MoSCC 305 in the home network 100*b* sends a Create Chain Response message to the SM 303 in the home network 100*b*. This response message is a response to the request message in step 1502. The response message comprises information which indicates that the chain has been created.

Step 1506

The SM 303 in the visited network 100*a* sends a create session request message to the PGW 113 in the home network 100*b*.

Step 1507

PGW 113 in the home network 100*b* creates the requested session and allocates an IP address. The IP address may be allocated using a local IP address pool. The allocation of the IP address may be coordinated with the IAP 310 in the visited network 100*a*.

Step 1508

The SM 303 in the visited network 100*a* sends a create session response message to the PGW 113 in the home network 100*b*. This response message is a response to the request message in step 1506.

Step 1509

The PGW 113 in the home network 100*b* may send the payload to SM 303 in the visited network via the IAP' 310 and the UPF 308 in the visited network 100*a*.

This scenario 3 is the opposite of scenario 2. In the uplink, a UPF 308 in the visited network 100*a* will need to convert the outgoing packets to GTP-U packets. In the downlink, a UPF 308 in the visited network 100*a* needs to be able to receive GTP-U packets and convert them to an encapsulation for MSC. The same solution as described in the previous scenario 2 can be re-used here.

Figure 16:
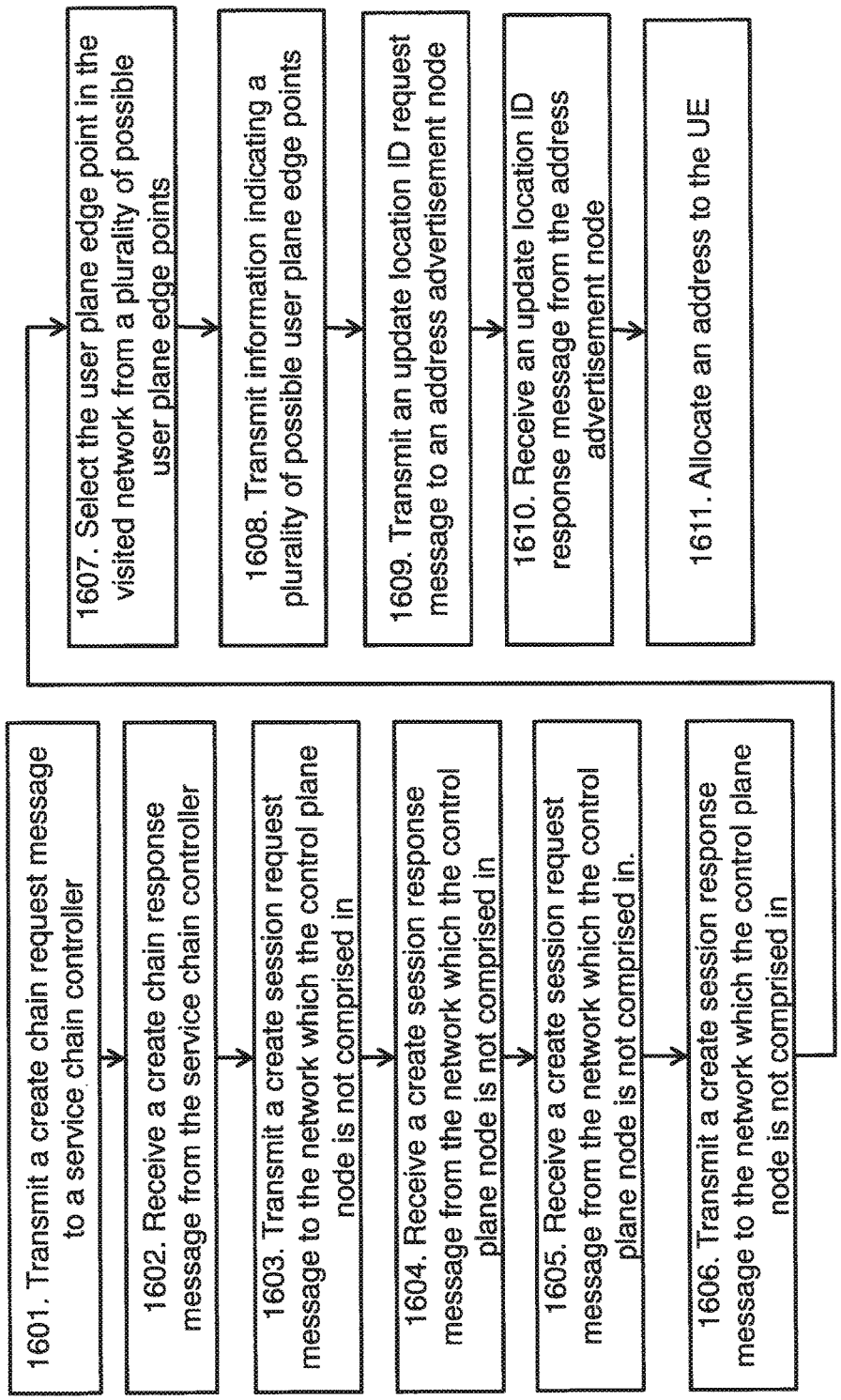
FIG. 16 is a flow chart illustrating embodiments of a method performed by a control plane node.

The method described above will now be described seen from the perspective of the control plane node 303. FIG. 16 is a flowchart describing the present method performed by the control plane node 303 for handling a UE 101 which roams into a visited network 100*a*. The control plane node 303 is comprised in the visited network 100*a* or in a home network 100*b*. At least the network in which the control plane node 303 is comprised is a MSC network. The visited network 100*a* may comprise a SGW when the visited network 100*a* is a 3GPP EPC network and when the home network 100*b* is a MSC network and comprises the control plane node 303. The home network 100*b* may comprise a PGW when the home network 100*b* is a 3GPP EPC network and when the visited network 100*a* is a MSC network and comprises the control plane node 303. The visited network 100*a* may be a MSC network and the home network 100*b* may be a 3GPP EPC network, or the visited network 100*a* may be the 3GPP EPC network and the home network 100*b* may be the MSC network, or both the visited network 100*a* and the home network 100*b* may be MSC networks.

The method exemplified in FIG. 16 comprises at least some of the following steps, which steps may be performed in any suitable order than described below:

Step 1601

This step corresponds to step 901 in FIG. 9, step 1201 in FIG. 12*a*, step 1210 in FIG. 12*b*, step 1305 in FIG. 13 and step 1502 in FIG. 15. When the UE 101 roams into the visited network 100*a*, the control plane node 303 transmits a create chain request message to a service chain controller 305. The create chain request message is a request to create a chain of UPF nodes 308 that user plane packets to or from the UE 101 should traverse. The create chain request message comprises an identity of the UE 101. The control plane node 303 may comprise information about which type the home network 100*b* is. The type of the home network 100*b* may be MSC or 3GPP EPC.

Step 1602

This step corresponds to step 904 in FIG. 9, step 1205 in FIG. 12*a*, step 1213 in FIG. 12*b*, step 1308 in FIG. 13 and step 1505 in FIG. 15. The control plane node 303 receives a create chain response message from the service chain controller 305. The create chain response message indicates that the requested chain has been created. The create chain response message comprises information which indicates at least one of an address and an identifier of a user plane edge point 308, 310 in the network in which the control plane node 303 is comprised and which the user plane packets should travers in the created chain. The address of the user plane edge point 308, 310 may be an IP address and the identifier is a TEID.

Step 1603

This step corresponds to step 1206 in FIG. 12*a* and step 1506 in FIG. 15. The control plane node 303 may transmit a create session request message to the network which the control plane node 303 is not comprised in. The create session request message comprises at least one of the address and identifier of the user plane edge point 308, 310.

The create session request message may be GTP based if the control plane node 303 knows that either the visited network 100*a* or the home network 100*b* are 3GPP EPC networks.

The create session request message may comprise information indicating an user plane edge point 308, 310 which the home network 100*b* shall use for downlink traffic to the UE 101 when the visited network 100*a* knows that the home network 100*b* is a MSC network.

The create session request message may be based on 3GPP EPC when the visited network 100*a* is unaware of which type the home network 100*b* is.

Step 1604

This step corresponds to step 1214 in FIG. 12*b* and step 1508 in FIG. 15. The control plane node 303 may receive a create session response message from the network which the control plane node 303 is not comprised in.

Step 1605

This step corresponds to step 1206 in FIG. 12*a* and step 1301 in FIG. 13. The control plane node 303 may receive a create session request message from the network which the control plane node 303 is not comprised in.

The create session request message may be GTP based if the control plane node 303 knows that either the visited network 100*a* or the home network 100*b* are 3GPP EPC networks.

The create session request message may comprise information indicating an user plane edge point 308, 310 which the home network 100*b* shall use for downlink traffic to the UE 101 when the visited network 100*a* knows that the home network 100*b* is a MSC network.

The create session request message may be based on 3GPP EPC when the visited network 100*a* is unaware of which type the home network 100*b* is.

Step 1606

This step corresponds to step 1214 in FIG. 12*b* and step 1309 in FIG. 13. The control plane node 303 may transmit a create session response message to the network which the control plane node 303 is not comprised in.

Step 1607

When the control plane node 303 is comprised in the visited network 100*a* which is a MSC network, the control plane node 303 may select the user plane edge point 308, 310 in the visited network 100*a* from a plurality of possible user plane edge points 308, 310.

Step 1608

When the control plane node 303 is comprised in the visited network 100*a* which is a MSC network and the home network 100*b* is also a MSC network, the control plane node 303 may transmit information indicating a plurality of possible user plane edge points 308, 310 in the visited network 100*a* to the home network 100*b* for selection of the user plane edge point 308, 310.

Step 1609

This step corresponds to step 1007 in FIG. 10. When the control plane node 303 is comprised in the home network 100*b* which is a MSC network, the control plane node 303 may transmit an update location ID request message to an address advertisement node 310. The update location ID request message comprises information indicating at least one of a user plane edge point of the visited network 100*a* and a user plane edge point of the home network 100*b*.

Step 1610

This step corresponds to step 1008 in FIG. 10. This step is performed after step 1609. The control plane node 303 may receive an update location ID response message from the address advertisement node 310.

Step 1611

This step corresponds to step 1209 in FIG. 12*a* and step 1304 in FIG. 13. When the control plane node 303 is comprised in the home network 100*b*, the control plane node 303 may allocate an address to the UE 101. The allocation of the address may be coordinated with an address advertisement node 310.

Figure 17:
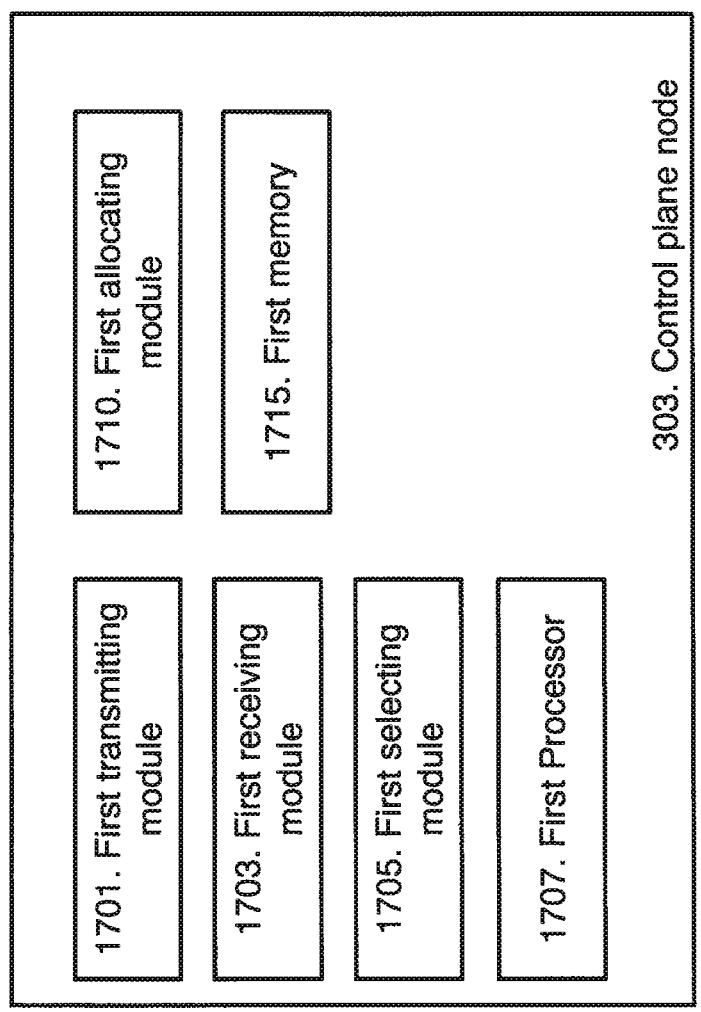
FIG. 17 is a schematic block diagram illustrating embodiments of a control plane node.

To perform the method steps shown in FIG. 16 for handling a UE 101, which roams into a visited network 100*a*, the control plane node 303 comprises an arrangement as shown in FIG. 17.

To perform the method steps shown in FIG. 17 for handling a UE 101, which roams into a visited network 100*a*, the control plane node 303 is adapted to, e.g. by means of a first transmitting module 1701, transmit a create chain request message to a service chain controller 305 when the UE 101 roams into the visited network 100*a*. The create chain request message is a request to create a chain of UPF nodes 308 that user plane packets to or from the UE 101 should traverse. The create chain request message comprises an identity of the UE 101. The first transmitting module 1701 may also be referred to as a first transmitting unit, a first transmitting means, a first transmitting circuit, first means for transmitting, first output unit etc. The first transmitting module 1701 may be a transmitter, a transceiver etc. The first transmitting module 1701 may be a wireless transmitter of the control plane node 303 of a wireless or fixed communications system.

The control plane node 303 is adapted to, e.g. by means of a first receiving module 1703, receive a create chain response message from the service chain controller 305. The create chain response message indicates that the requested chain has been created. The create chain response message comprises information which indicates at least one of an address and an identifier of a user plane edge point 308, 310 in the network in which the control plane node 303 is comprised and which the user plane packets should travers in the created chain. The first receiving module 1703 may also be referred to as a first receiving unit, a first receiving means, a first receiving circuit, first means for receiving, first input unit etc. The first receiving module 1703 may be a receiver, a transceiver etc. The first receiving module 1703 may be a wireless receiver of the control plane node 303 of a wireless or fixed communications system.

The control plane node 303 may be adapted to, e.g. by means of the first transmitting module 1701, transmit a create session request message to the network which the control plane node 303 is not comprised in. The create session request message may comprise at least one of the address and identifier of the user plane edge point 308, 310. The address of the user plane edge point 308, 310 may be an IP address and the identifier is a TEID. The create session request message may be GTP based if the control plane node 303 knows that either the visited network 100*a* or the home network 100*b* are 3GPP EPC networks. The create session request message may comprise information indicating an user plane edge point 308, 310 which the home network 100*b* shall use for downlink traffic to the UE 101 when the visited network 100*a* knows that the home network 100*b* is a MSC network. The create session request message may be based on 3GPP EPC when the visited network 100*a* is unaware of which type the home network 100*b* is.

The control plane node 303 may be adapted to, e.g. by means of the first receiving module 1703, receive a create session response message from the network which the control plane node 303 is not comprised in.

The control plane node 303 may be adapted to, e.g. by means of the first receiving module 1703, receive a create session request message from the network which the control plane node 303 is not comprised in.

The control plane node 303 may be adapted to, e.g. by means of the first transmitting module 1701, transmit a create session response message to the network which the control plane node 303 is not comprised in.

When the control plane node 303 is comprised in the visited network 100*a* which is a MSC network, the control plane node 303 may be further adapted to, e.g. by means of a first selecting module 1705, select the user plane edge point 308, 310 in the visited network 100*a* from a plurality of possible user plane edge points 308, 310. The first selecting module 1705 may also be referred to as a first selecting unit, a first selecting means, a first selecting circuit, first means for selecting etc. The first selecting module 1705 may be a first processor 1707 of the control plane node 303.

When the control plane node 303 is comprised in the visited network 100*a* which is a MSC network and the home network 100*b* is also a MSC network, the control plane node 303 may be further adapted to, e.g. by means of the first transmitting module 1701, transmit information indicating a plurality of possible user plane edge points 308, 310 in the visited network 100*a* to the home network 100*b* for selection of the user plane edge point 308, 310.

When the control plane node 303 is comprised in the home network 100*b* which is a MSC network, the control plane node 303 may be further adapted to, e.g. by means of the first transmitting module 1701, transmit an update location ID request message to an address advertisement node 310. The update location ID request message may comprise information indicating at least one of an edge point of the visited network 100*a* and an edge point of the home network 100*b*.

The control plane node 303 may be further adapted to, e.g. by means of the first receiving module 1703, receive an update location ID response message from the address advertisement node 310.

The control plane node 303 may be adapted to, e.g. by means of a first allocating module 1710, allocate an address to the UE 101 when the control plane node 303 is comprised in the home network 100*b*. The allocation of the address may be coordinated with an address advertisement node 310. The first allocating module 1710 may also be referred to as a first allocating unit, a first allocating means, a first allocating circuit, first means for allocating etc. The first allocating module 1710 may be the first processor 1707 of the control plane node 303.

The control plane node 303 may comprise information about which type the home network 100*b*. The type of the home network 100*b* may be MSC or 3GPP EPC.

The visited network 100*a* may comprise a SGW when the visited network 100*a* is a 3GPP EPC network and when the home network 100*b* is a MSC network and comprises the control plane node 303. The home network 100*b* may comprise a PGW when the home network 100*b* is a 3GPP EPC network and when the visited network 100*a* is a MSC network and comprises the control plane node 303. The visited network 100*a* may be a MSC network and the home network 100*b* may be a 3GPP EPC network, or the visited network 100*a* may be the 3GPP EPC network and the home network 100*b* may be the MSC network, or both the visited network 100*a* and the home network 100*b* may be MSC networks.

The control plane node 303 may further comprise a first memory 1715 comprising one or more memory units. The memory 1715 is arranged to be used to store data, received data streams, power level measurements, request messages, response messages, information about created chains, information which identifies a user plane edge point, location ID, threshold values, time periods, information about type of network (e.g. MSC or 3GPP EPC), configurations, schedulings, and applications to perform the methods herein when being executed in the control plane node 303. The first memory 1715 comprises instructions executable by the first processor 1707.

Those skilled in the art will also appreciate that the first transmitting module 1701, the first receiving module 1703, the first selecting module 1705 and the first allocating module 1710 described above may refer to a combination of analog and digital circuits, and/or one or more processors configured with software and/or firmware, e.g. stored in a memory, that when executed by the one or more processors such as the first processor 1707 perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

In some embodiments, a first computer program may comprise instructions which, when executed on at least one processor (e.g. the first processor 1707), cause the at least one processor to carry out the method steps in FIG. 16. A first carrier may comprise the first computer program, and the first carrier is one of an electronic signal, optical signal, radio signal or computer readable storage medium.

Figure 18:
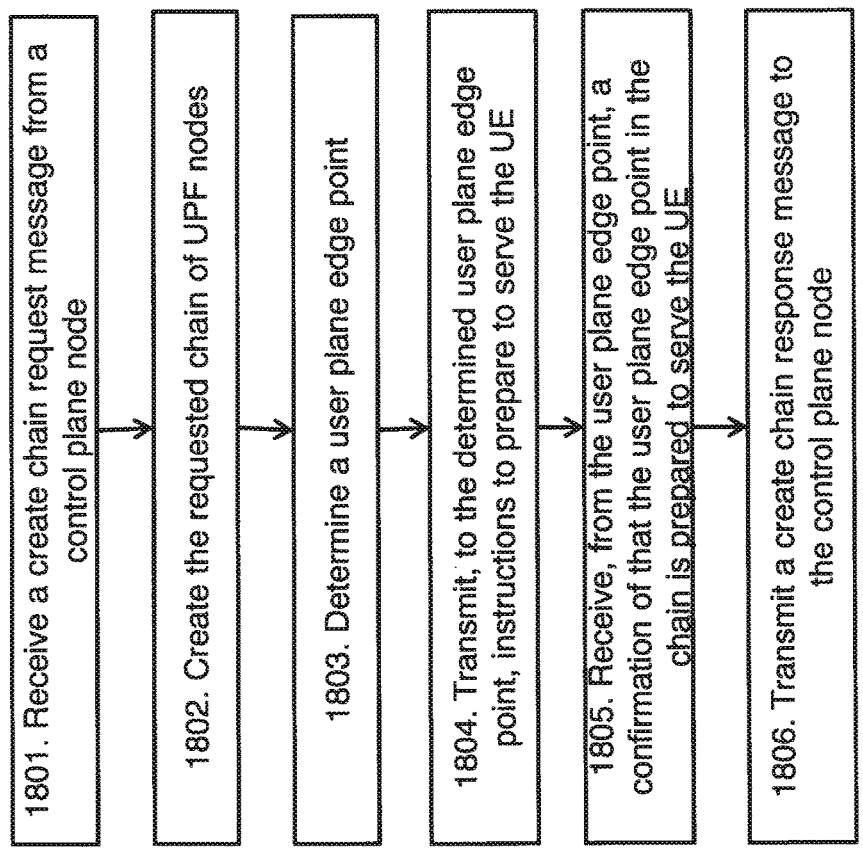
FIG. 18 is a flow chart illustrating embodiments of a method performed by a service chain controller.

The method described above will now be described seen from the perspective of the service chain controller 305. FIG. 18 is a flowchart describing the present method performed by the service chain controller 305 for handling a UE 101 which roams into a visited network 100*a*. The service chain controller 305 is comprised in the visited network 100*a* or in the home network 100*b*. At least the network in which the service chain controller 305 is comprised is a MSC network. The method exemplified in FIG. 18 comprises at least some of the following steps, which steps may be performed in any suitable order than described below:

Step 1801

This step corresponds to step 901 in FIG. 9, step 1201 in FIG. 12*a*, step 1210 in FIG. 12*b*, step 1305 in FIG. 13 and step 1502 in FIG. 15. When the UE 101 roams into the visited network 100*a*, the service chain controller 305 receives a create chain request message from a control plane node 303. The create chain request message is a request to create a chain of UPF nodes 308 that user plane packets to or from the UE 101 should traverse. The create chain request message comprises an identity of the UE 101.

Step 1802

The service chain controller 305 creates the requested chain of UPF nodes 308.

Step 1803

The service chain controller 305 determines a user plane edge point 308, 310 in the network which the control plane node 303 is comprised and which the user plane packets should travers.

Step 1804

This step corresponds to step 902 in FIG. 9, step 1203 in FIG. 12*a*, step 1211 in FIG. 12*b*, step 1306 in FIG. 13 and step 1503 in FIG. 15. The service chain controller 305 transmits, to the determined user plane edge point 308, 310, instructions to prepare to serve the UE 101 and the identity of the UE 101.

Step 1805

This step corresponds to step 903 in FIG. 9, step 1204 in FIG. 12*a*, step 1212 in FIG. 12*b*, step 1307 in FIG. 13 and step 1504 in FIG. 15. The service chain controller 305 receives, from the user plane edge point 308, 310, a confirmation of that the user plane edge point 308, 310 in the chain is prepared to serve the UE 101 and information indicating at least one of an address and identifier of the user plane edge point 308, 310 in the network which the control plane node 303 is comprised and which the user plane packets should travers.

Step 1806

This step corresponds to step 904 in FIG. 9, step 1205 in FIG. 12*a*, step 1213 in FIG. 12*b*, step 1308 in FIG. 13 and step 1505 in FIG. 15. The service chain controller 305 transmits a create chain response message to the control plane node 303. The create chain response message indicates that the requested chain has been created. The create chain response message comprises information which indicates the at least one of the address and identifier of the user plane edge point 308, 310 in the network in which the control plane node 303 is comprised and which the user plane packets should travers in the created chain.

The visited network 100*a* may comprise a SGW when the visited network 100*a* is a 3GPP EPC network and when the home network 100*b* is a MSC network and comprises the control plane node 303. The home network 100*b* may comprise a PGW when the home network 100*b* is a 3GPP EPC network and when the visited network 100*a* is a MSC network and comprises the control plane node 303. The visited network 100a may be a MSC network and the home network 100b may be a 3GPP EPC, network, or the visited network 100a may be the 3GPP EPC network and the home network 100b may be the MSC network, or both the visited network 100a and the home network 100b may be MSC networks.

Figure 19:
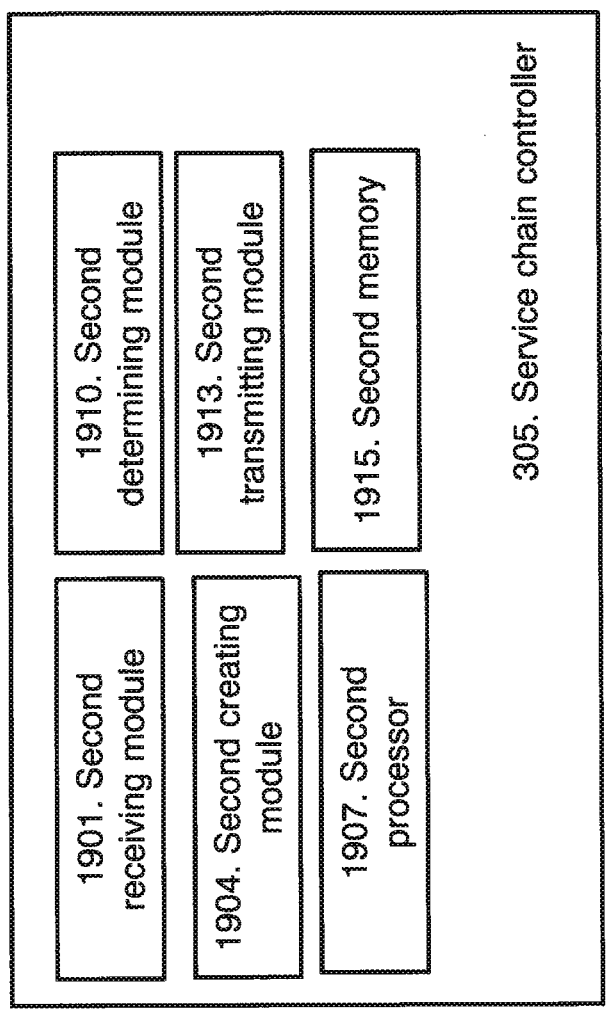
FIG. 19 is a schematic block diagram illustrating embodiments of a service chain controller.

To perform the method steps shown in FIG. 18 for handling a UE 101, which roams into a visited network 100a, the service chain controller 305 comprises an arrangement as shown in FIG. 19. The service chain controller 305 is comprised in the visited network 100a or in a home network 100b. At least the network in which the service chain controller 305 is comprised is a MSC network.

To perform the method steps shown in FIG. 17 for handling a UE 101, which roams into a visited network 100a, the service chain controller 305 is adapted to, e.g. by means of a second receiving module 1901, when the UE 101 roams into the visited network 100a, receive a create chain request message from a control plane node 303. The create chain request message is a request to create a chain of UPF nodes 308 that user plane packets to or from the UE 101 should traverse and wherein the create chain request message comprises an identity of the UE 101. The second receiving module 1901 may also be referred to as a second receiving unit, a second receiving means, a second receiving circuit, second means for receiving, first input unit etc. The second receiving module 1901 may be a receiver, a transceiver etc. The second receiving module 1901 may be a wireless receiver of the service chain controller 305 of a wireless or fixed communications system.

The service chain controller 305 is adapted to, e.g. by means of a second creating module 1904, create the requested chain of UPF nodes 308. The second creating module 1904 may be a second processor 1907 of the service chain controller 305. The second creating module 1904 may also be referred to as a second creating unit, a second creating means, a second creating circuit, second means for creating etc. The second creating module 1904 may be a second processor 1907 of the service chain controller 305.

The service chain controller 305 is adapted to, e.g. by means of a second determining module 1910, determine a user plane edge point 308, 310 in the network which the control plane node 303 is comprised and which the user plane packets should travers.

The second determining module 1910 may also be referred to as a second determining unit, a second determining means, a second determining circuit, second means for determining etc. The second determining module 1910 may be the second processor 1907 of the service chain controller 305.

The service chain controller 305 is adapted to, e.g. by means of a second transmitting module 1913, transmit, to the determined user plane edge point 308, 310, instructions to prepare to serve the UE 101 and the identity of the UE 101. The second transmitting module 1913 may also be referred to as a second transmitting unit, a second transmitting means, a second transmitting circuit, second means for transmitting, second output unit etc. The second transmitting module 1913 may be a transmitter, a transceiver etc. The second transmitting module 1913 may be a wireless transmitter of the service chain controller 305 of a wireless or fixed communications system.

The service chain controller 305 is adapted to, e.g. by means of the second receiving module 1901, receive, from the user plane edge point 308, 310, a confirmation of that the user plane edge point 308, 310 in the chain is prepared to serve the UE 101 and information indicating at least one of an address and identifier of the user plane edge point 308, 310 in the network which the control plane node 303 is comprised and which the user plane packets should travers; and to The service chain controller 305 is adapted to, e.g. by means of the second transmitting module 1913, transmit a create chain response message to the control plane node 303. The create chain response message indicates that the requested chain has been created. The create chain response message comprises information which indicates the at least one of the address and identifier of the user plane edge point 308, 310 in the network in which the control plane node 303 is comprised and which the user plane packets should travers in the created chain.

The visited network 100a may comprise a SGW when the visited network 100a is a 3GPP EPC network and when the home network 100b is a MSC network and comprises the control plane node 303. The home network 100b may comprise a PGW when the home network 100b is a 3GPP EPC network and when the visited network 100a is a MSC network and comprises the control plane node 303. The visited network 100a may be a MSC network and the home network 100b may be a 3GPP EPC network, or the visited network 100a may be the 3GPP EPC network and the home network 100b may be the MSC network, or both the visited network 100a and the home network 100b may be MSC networks.

The service chain controller 305 may further comprise a second memory 1915 comprising one or more memory units. The second memory 1915 is arranged to be used to store data, received data streams, power level measurements, request messages, response messages, information about created chains, information which identifies a user plane edge point, location ID, threshold values, time periods, information about type of network (e.g. MSC or 3GPP EPC), configurations, schedulings, and applications to perform the methods herein when being executed in the service chain controller 305. The second memory 1915 comprises instructions executable by the second processor 1907.

Those skilled in the art will also appreciate that the second receiving module 1901, the second creating module 1904, the second determining module 1910 and the second transmitting module 1913 described above may refer to a combination of analog and digital circuits, and/or one or more processors configured with software and/or firmware, e.g. stored in a memory, that when executed by the one or more processors such as the second processor 1907 perform as described above. One or more of these processors, as well as the other digital hardware, may be included in a single ASIC, or several processors and various digital hardware may be distributed among several separate components, whether individually packaged or assembled into a SoC.

In some embodiments, a second computer program may comprise instructions which, when executed on at least one processor (e.g. the second processor 1907), cause the at least one processor to carry out the method steps in FIG. 18. A second carrier may comprise the second computer program, and the second carrier is one of an electronic signal, optical signal, radio signal or computer readable storage medium.

Figure 20:
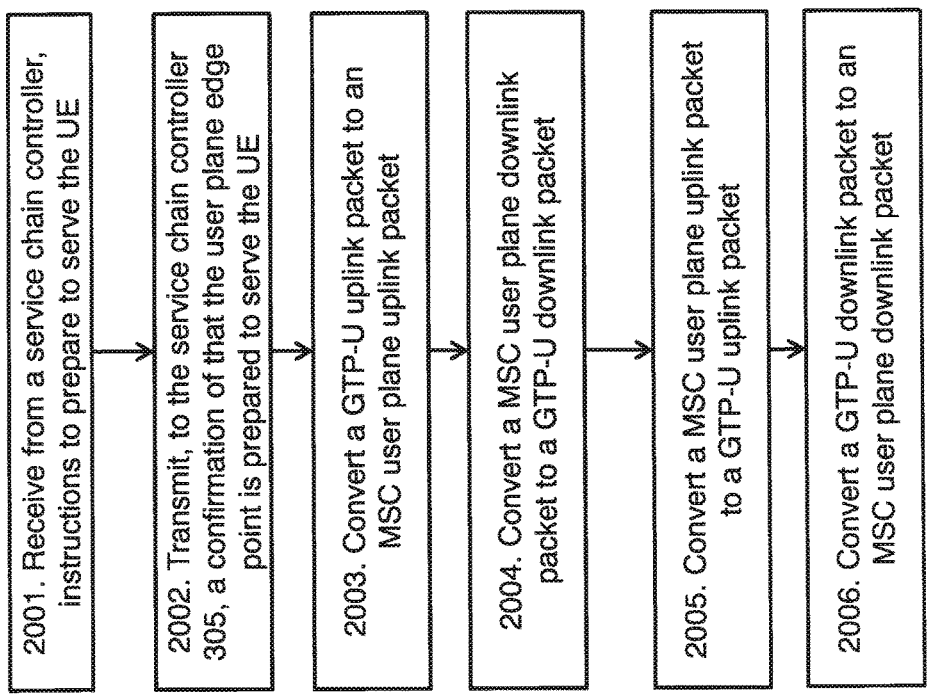
FIG. 20 is a flow chart illustrating embodiments of a method performed by a user plane edge point.

The method described above will now be described seen from the perspective of the user plane edge point 308, 310. FIG. 20 is a flowchart describing the present method performed by the user plane edge point 308, 310 for handling a UE 101 which roams into a visited network 100a. The user plane edge point 308, 310 is comprised in the visited network 100a or in a home network 100b. At least the network in which the user plane edge point 308, 310 is comprised is a MSC network. The user plane edge point 308, 310 may be an address advertisement node 310 or a UPF node 308. The address advertisement node 310 may be an IAP or an IAP'. The method exemplified in FIG. 20 comprises at least some of the following steps, which steps may be performed in any suitable order than described below:

Step 2001

This step corresponds to step 902 in FIG. 9, step 1203 in FIG. 12a, step 1211 in FIG. 12b, step 1306 in FIG. 13 and step 1503 in FIG. 15. The user plane edge point 308, 310 receives, from a service chain controller 305, instructions to prepare to serve the UE 101. The instructions comprise the identity of the UE 101.

Step 2002

This step corresponds to step 903 in FIG. 9, step 1204 in FIG. 12a, step 1212 in FIG. 12b, step 1307 in FIG. 13 and step 1504 in FIG. 15. The user plane edge point 308, 310 transmits, to the service chain controller 305, a confirmation of that the user plane edge point 308, 310 is prepared to serve the UE 101 and information indicating at least one of an address and identifier of the user plane edge point 308, 310 in the visited network 100a which the user plane packets should travers.

Step 2003

This step corresponds to steps 1402, 1403 and 1404 in FIG. 14. The user plane edge point 308, 310 may be comprised in the home network 100b which is a MSC network. The user plane edge point 308, 310 may convert a GTP-U uplink packet to an MSC user plane uplink packet.

Step 2004

This step corresponds to steps 1402, 1403 and 1404 in FIG. 14. The user plane edge point 308, 310 may be comprised in the home network 100b which is a MSC network. The user plane edge point 308, 310 may convert a MSC user plane downlink packet to a GTP-U downlink packet.

Step 2005

This step corresponds to steps 1402, 1403 and 1404 in FIG. 14. The user plane edge point 308, 310 may be comprised in the visited network 100a which is a MSC network. The user plane edge point 308, 310 may convert a MSC user plane uplink packet to a GTP-U uplink packet.

Step 2006

This step corresponds to steps 1402, 1403 and 1404 in FIG. 14. The user plane edge point 308, 310 may be comprised in the visited network 100a which is a MSC network. The user plane edge point 308, 310 may convert a GTP-U downlink packet to an MSC user plane downlink packet.

Figure 21:
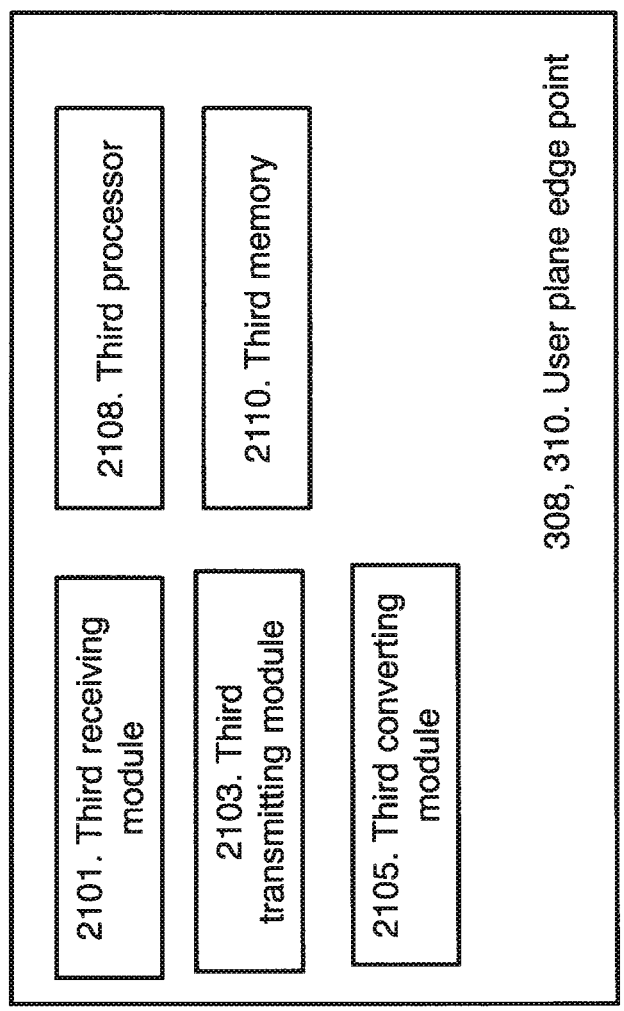
FIG. 21 is a schematic block diagram illustrating embodiments of a user plane edge point.

To perform the method steps shown in FIG. 20 for handling a UE 101, which roams into a visited network 100a, the user plane edge point 308, 310 comprises an arrangement as shown in FIG. 21. The user plane edge point 308, 310 is comprised in the visited network 100a or in a home network 100b. At least the network in which the user plane edge point 308, 310 is comprised is a MSC network. The user plane edge point 308, 310 may be an address advertisement node 310 or a UPF node 308.

To perform the method steps shown in FIG. 20 for handling a UE 101, which roams into a visited network 100a, the user plane edge point 308, 310 is adapted to, e.g. by a third receiving module 2101, receive from a service chain controller 305, instructions to prepare to serve the UE 101. The instructions comprise the identity of the UE 101. The third receiving module 2101 may also be referred to as a third receiving unit, a third receiving means, a third receiving circuit, third means for receiving, third input unit etc. The third receiving module 2101 may be a receiver, a transceiver etc. The third receiving module 2101 may be a wireless receiver of the user plane edge point 308, 310 of a wireless or fixed communications system.

The user plane edge point 308, 310 is adapted to, e.g. by means of a third transmitting module 2103, transmit, to the service chain controller 305, a confirmation of that the user plane edge point 308, 310 is prepared to serve the UE 101 and information indicating at least one of an address and identifier of the user plane edge point 308, 310 in the visited network 100a which the user plane packets should travers. The third transmitting module 2103 may also be referred to as a third transmitting unit, a third transmitting means, a third transmitting circuit, third means for transmitting, third output unit etc. The third transmitting module 2103 may be a transmitter, a transceiver etc. The third transmitting module 2103 may be a wireless transmitter of the user plane edge point 308, 310 of a wireless or fixed communications system.

The user plane edge point 308, 310 may be comprised in the home network 100b which is a MSC network. The user plane edge point 308, 310 may be further adapted to, e.g. by means of a third converting module 2105, convert a GTP-U uplink packet to an MSC user plane uplink packet. The third converting module 2105 may also be referred to as a third converting unit, a third converting means, a third converting circuit, third means for converting etc. The third converting module 2105 may be a third processor 2108 of the user plane edge point 308, 310.

The user plane edge point 308, 310 may be adapted to, e.g. by means of the third converting module 2105, convert a MSC user plane downlink packet to a GTP-U downlink packet.

The user plane edge point 308, 310 may be comprised in the visited network 100a which is a MSC network. The user plane edge point 308, 310 may be adapted to, e.g. by means of the third converting module 2105, convert a MSC user plane uplink packet to a GTP-U, uplink packet. The user plane edge point 308, 310 may be adapted to, e.g. by means of the third converting module 2105, convert a GTP-U downlink packet to an MSC user plane downlink packet.

The user plane edge point 308, 310 may further comprise a third memory 2110 comprising one or more memory units. The third memory 2110 is arranged to be used to store data, received data streams, power level measurements, request messages, response messages, information about created chains, information which identifies a user plane edge point, location ID, threshold values, time periods, information about type of network (e.g. MSC or 3GPP EPC), configurations, schedulings, and applications to perform the methods herein when being executed in the user plane edge point 308, 310. The third memory 2108 comprises instructions executable by the third processor 2108.

Those skilled in the art will also appreciate that the third receiving module 2101, the third transmitting module 2103 and the third converting module 2105 described above may refer to a combination of analog and digital circuits, and/or one or more processors configured with software and/or firmware, e.g. stored in a memory, that when executed by the one or more processors such as the third processor 2108 perform as described above. One or more of these processors, as well as the other digital hardware, may be included in a single ASIC, or several processors and various digital hardware may be distributed among several separate components, whether individually packaged or assembled into a SoC.

In some embodiments, a third computer program may comprise instructions which, when executed on at least one processor (e.g. the third processor 2108), cause the at least one processor to carry out the method steps in FIG. 20. A third carrier may comprise the third computer program, and the third carrier is one of an electronic signal, optical signal, radio signal or computer readable storage medium.

The present mechanism for handling a UE 101 which roams into a visited network 100*a* may be implemented through one or more processors, such as a first processor 1707 in the control plane node arrangement depicted in FIG. 17, a second processor 1907 in the service chain controller arrangement in FIG. 19 and a third processor 2108 in the user plane edge point arrangement depicted in FIG. 21, together with computer program code for performing the functions of the embodiments herein. The processor may be for example a Digital Signal Processor (DSP), ASIC processor, Field-programmable gate array (FPGA) processor or micro processor. The program code mentioned above may also be provided as a computer program product, for instance in the form of a data carrier carrying computer program code for performing the embodiments herein when being loaded into at least one of the control plane node 303, the service chain controller 305 and the user plane edge point 308, 310. One such carrier may be in the form of a CD ROM disc. It is however feasible with other data carriers such as a memory stick. The computer program code can furthermore be provided as pure program code on a server and downloaded to at least one of the control plane node 303, the service chain controller 305 and the user plane edge point 308, 310.

The embodiments herein are not limited to the above described embodiments. Various alternatives, modifications and equivalents may be used. Therefore, the above embodiments should not be taken as limiting the scope of the embodiments, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operative to".

It should also be emphasized that the steps of the methods defined in the appended claims may, without departing from the embodiments herein, be performed in another order than the order in which they appear in the claims.

The invention claimed is:

1. A method performed by a control plane node for handling a user equipment (UE) that roams into a visited network, wherein the control plane node is comprised in a first network, the first network being one of the visited network and a home network, wherein the first network in which the control plane node is comprised is a Mobile Service Chaining (MSC) network, the method comprising:
after determining that the UE roams into the visited network, transmitting a create chain request message to a service chain controller, wherein the create chain request message is a request to create a chain of User Plane Function (UPF) nodes for processing user plane packets to or from the UE, and the create chain request message comprises an identity of the UE; and
receiving from the service chain controller a create chain response message that is responsive to the create chain request message, wherein the create chain response message indicates that the requested chain has been created and wherein the create chain response message comprises information that indicates at least one of an address and an identifier of a user plane edge point in the first network in which the control plane node is comprised.

2. The method according to claim 1, further comprising:
transmitting a create session request message a second network which the control plane node is not comprised in, wherein the create session request message comprises at least one of the address and identifier of the user plane edge point; and
receiving a create session response message from the second network which the control plane node is not comprised in.

3. The method according to claim 1, further comprising:
receiving a create session request message from a second network which the control plane node is not comprised in; and
transmitting a create session response message to the second network which the control plane node is not comprised in.

4. The method according to claim 2, wherein the create session request message is General packet radio service Tunneling Protocol message.

5. The method according to claim 2, wherein the create session request message comprises information indicating a user plane edge point which the home network shall use for downlink traffic to the UE.

6. The method according to claim 2, wherein the create session request message is based on 3GPP EPC when the visited network is unaware of which type the home network is.

7. The method according to claim 1, wherein the control plane node is comprised in the visited network, and wherein the method further comprises:
selecting the user plane edge point in the visited network from a plurality of possible user plane edge points.

8. The method according to claim 1, wherein the control plane node is comprised in the visited network, and wherein the method further comprises:
transmitting information indicating a plurality of possible user plane edge points in the visited network to the home network for selection of the user plane edge point.

9. The method according to claim 1, wherein the control plane node is comprised in the home network, and wherein the method further comprises:
transmitting an update location identity (ID) request message to an address advertisement node, wherein the update location ID request message comprises information indicating at least one of an user plane edge point of the visited network and an user plane edge point of the home network; and
receiving an update location ID response message from the address advertisement node.

10. The method according to claim 1, wherein the control plane node is comprised in the home network, and the method further comprises allocating an address to the UE.

11. The method according to claim 10, wherein the allocation of the address is coordinated with an address advertisement node.

12. The method according to claim 1, wherein the address of the user plane edge point is an Internet Protocol(IP) address and the identifier is a Tunnel Endpoint Identifier.

13. The method according to claim 1, wherein the control plane node comprises information indicating that the home network is one of: an MSC network and a Third Generation Partnership Project Evolved Packet Core network.

14. A control plane node for handling a user equipment (UE) which roams into a visited network, wherein the control plane node is comprised in a first network, the first network being one of the visited network and a home network, wherein the first network in which the control plane node is comprised is a Mobile Service Chaining (MSC) network, the control plane node comprising:
a memory; and
a processor coupled to the memory, wherein the control plane node is configured to:
transmit a create chain request message to a service chain controller when the UE roams into the visited network, wherein the create chain request message is a request to create a chain of User Plane Function (UPF) nodes for processing user plane packets to or from the UE, and wherein the create chain request message comprises an identity of the UE;
receive a create chain response message from the service chain controller, wherein the create chain response message indicates that the requested chain has been created and wherein the create chain response message comprises information which indicates at least one of an address and an identifier of a user plane edge point in the first network in which the control plane node is comprised;
transmit a create session request message to a second network which the control plane node is not comprised in, wherein the create session request message comprises at least one of the address and identifier of the user plane edge point; and
receive a create session response message from the second network which the control plane node is not comprised in.

15. The control plane node according to claim 14, being further configured to:
receive a create session request message from a second network which the control plane node is not comprised in; and to
transmit a create session response message to the second network which the control plane node is not comprised in.

16. The control plane node according to claim 14, wherein the create session request message is General packet radio service Tunneling Protocol message.

17. The control plane node according to claim 14, wherein the create session request message comprises information indicating a user plane edge point.

18. The control plane node according to claim 14, wherein the create session request message is based on 3GPP EPC.

19. The control plane node according to claim 14, wherein the control plane node is comprised in the visited network, and wherein the control plane node is further configured to:
select the user plane edge point in the visited network from a plurality of possible user plane edge points.

20. The control plane node according to claim 14, wherein the control plane node is comprised in the visited network, and wherein the control plane node is further configured to:
transmit information indicating a plurality of possible user plane edge points in the visited network to the home network for selection of the user plane edge point.

21. The control plane node according to claim 14, wherein the control plane node is comprised in the home network, and wherein the control plane node is further configured to:
transmit an update location identity (ID) request message to an address advertisement node, wherein the update location ID request message comprises information indicating at least one of an edge point of the visited network and an edge point of the home network; and to
receive an update location ID response message from the address advertisement node.

22. The control plane node according to claim 14, being further configured to:
allocate an address to the UE.

23. The control plane node according to claim 22, wherein the allocation of the address is coordinated with an address advertisement node.

24. The control plane node according to claim 14, wherein the address of the user plane edge point is an Internet Protocol, IP, address and the identifier is a Tunnel Endpoint Identifier, TEID.

25. The control plane node according to claim 14, wherein the control plane node comprises information about which type the home network is.

* * * * *